Jan. 22, 1935. C. D. KNOWLTON 1,988,452
BOX MAKING
Filed July 7, 1930 13 Sheets-Sheet 4
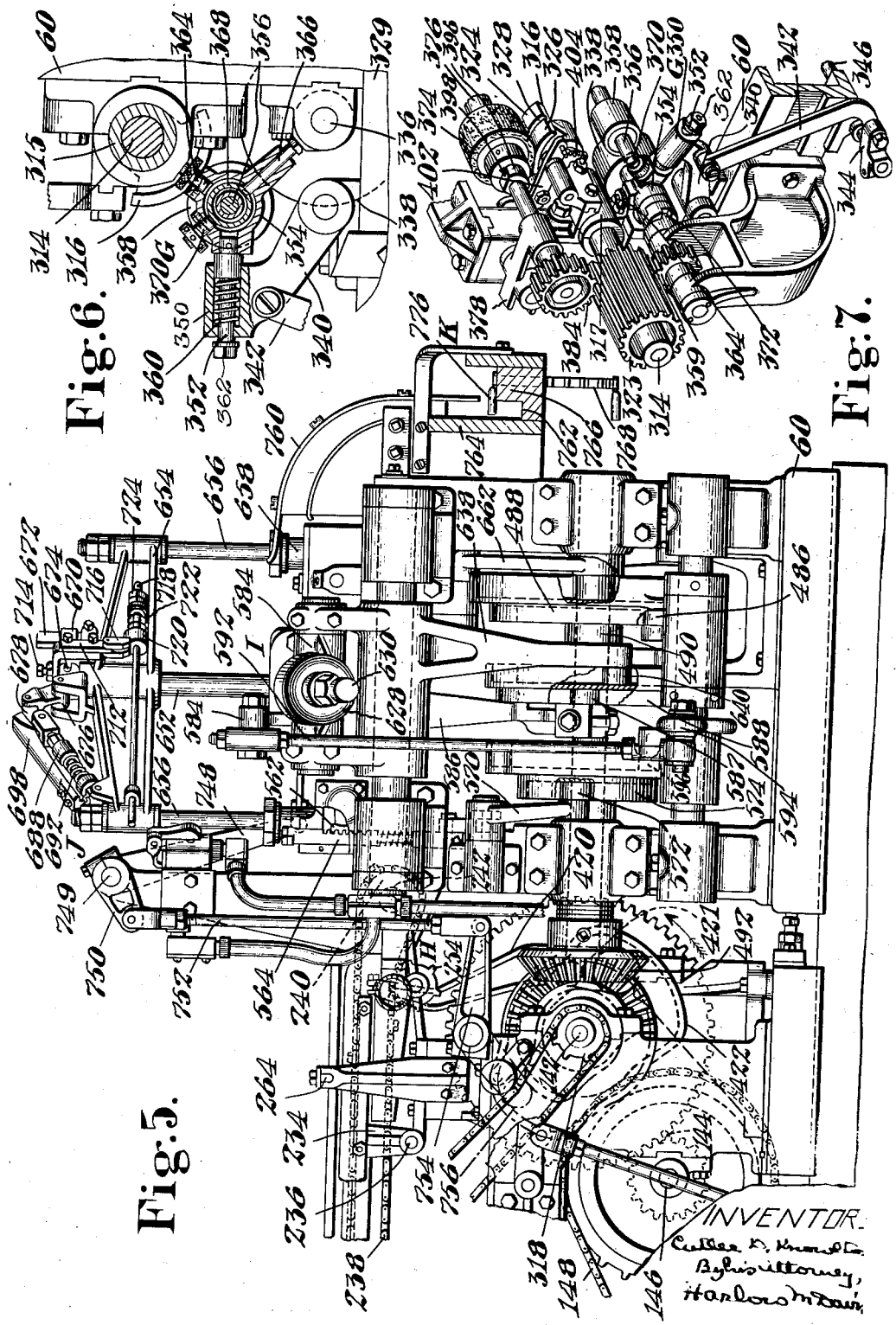

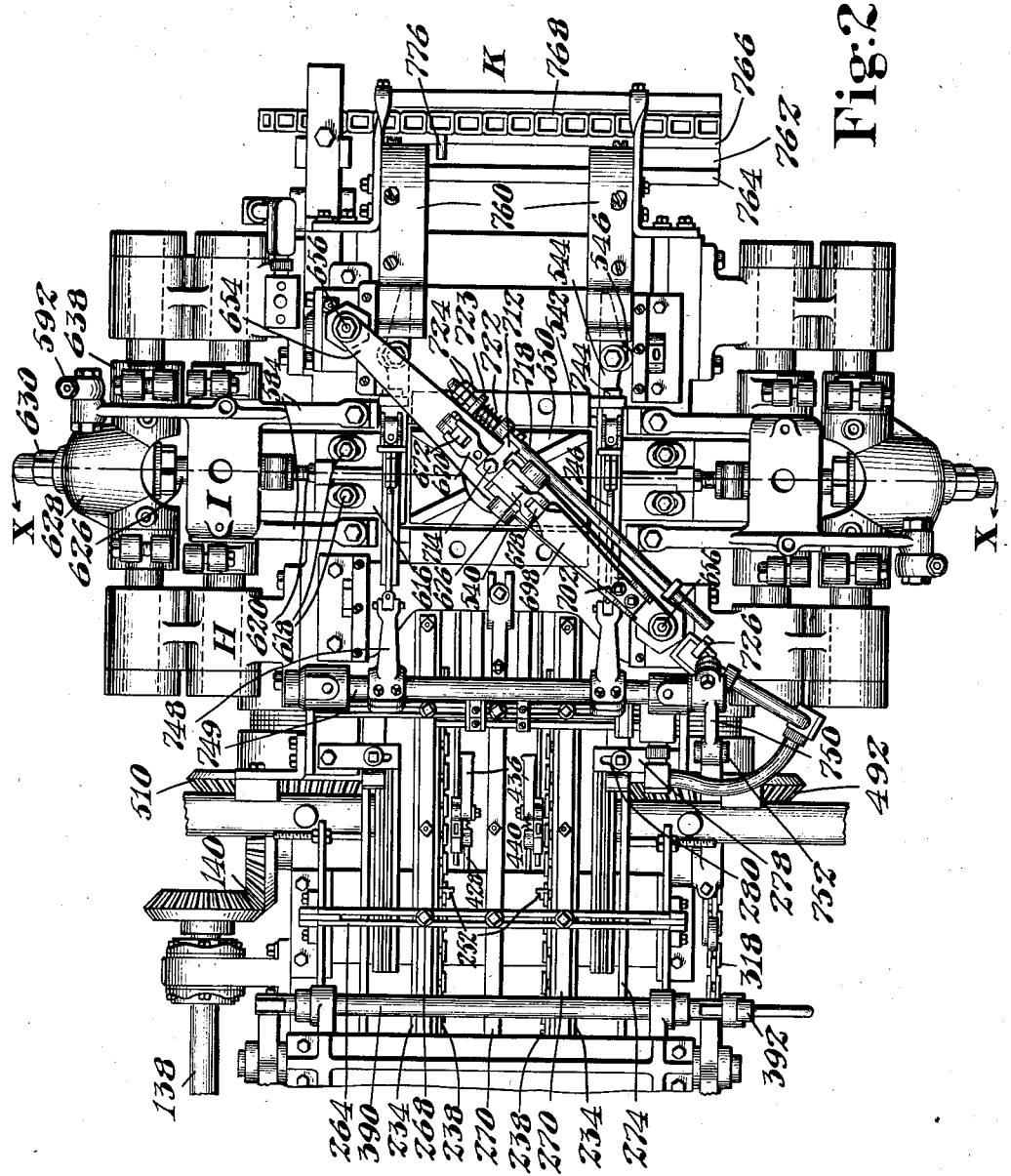

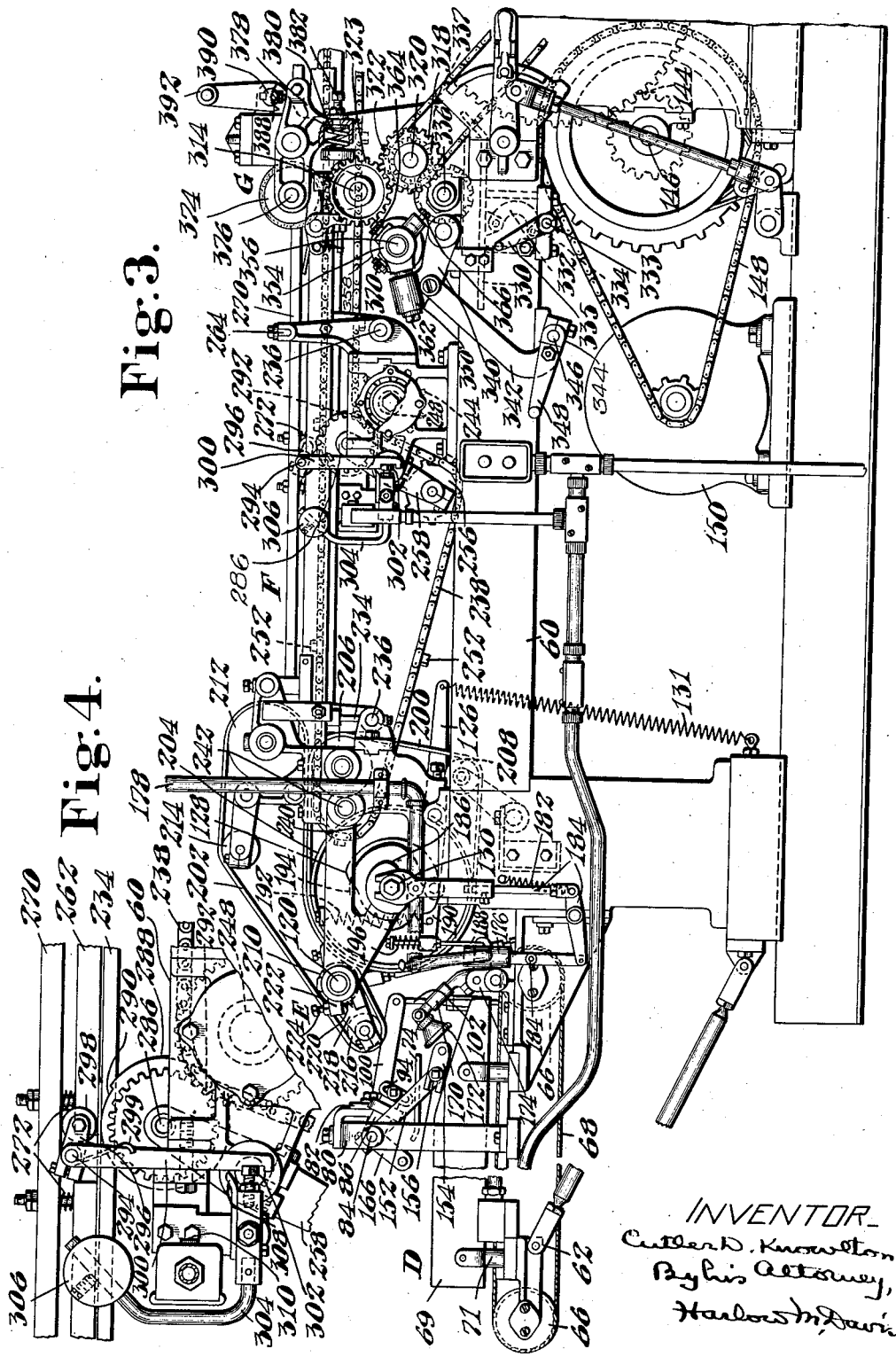

Jan. 22, 1935.  C. D. KNOWLTON  1,988,452
BOX MAKING
Filed July 7, 1930   13 Sheets-Sheet 7

INVENTOR
Cutler D. Knowlton
By his Attorney
Harlow M. Davis

Jan. 22, 1935. C. D. KNOWLTON 1,988,452
BOX MAKING
Filed July 7, 1930 13 Sheets-Sheet 8
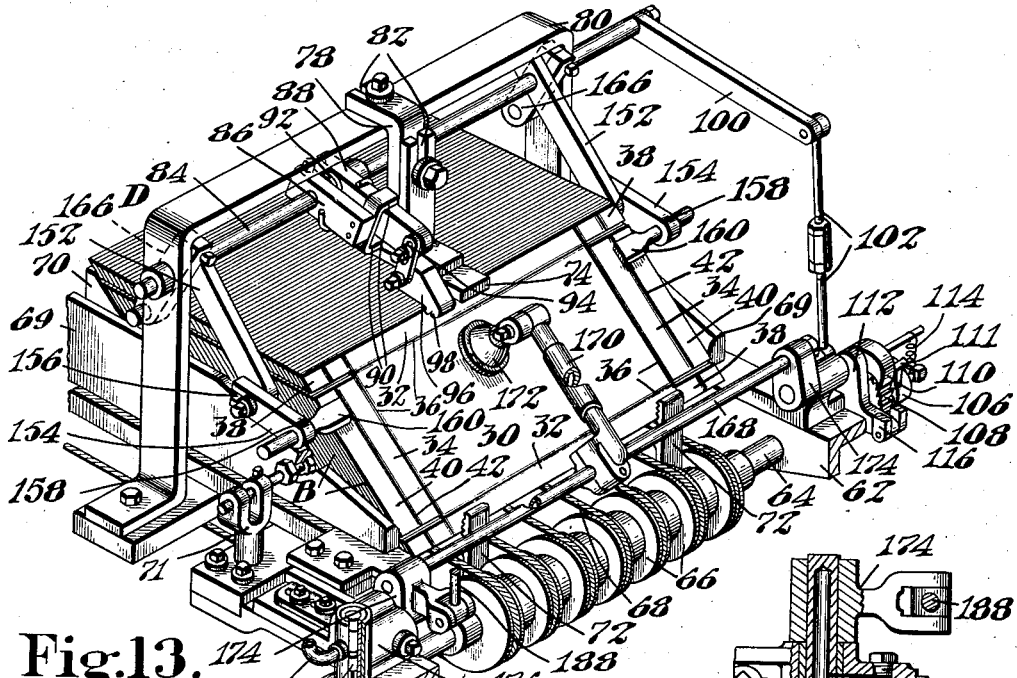
Fig. 13.
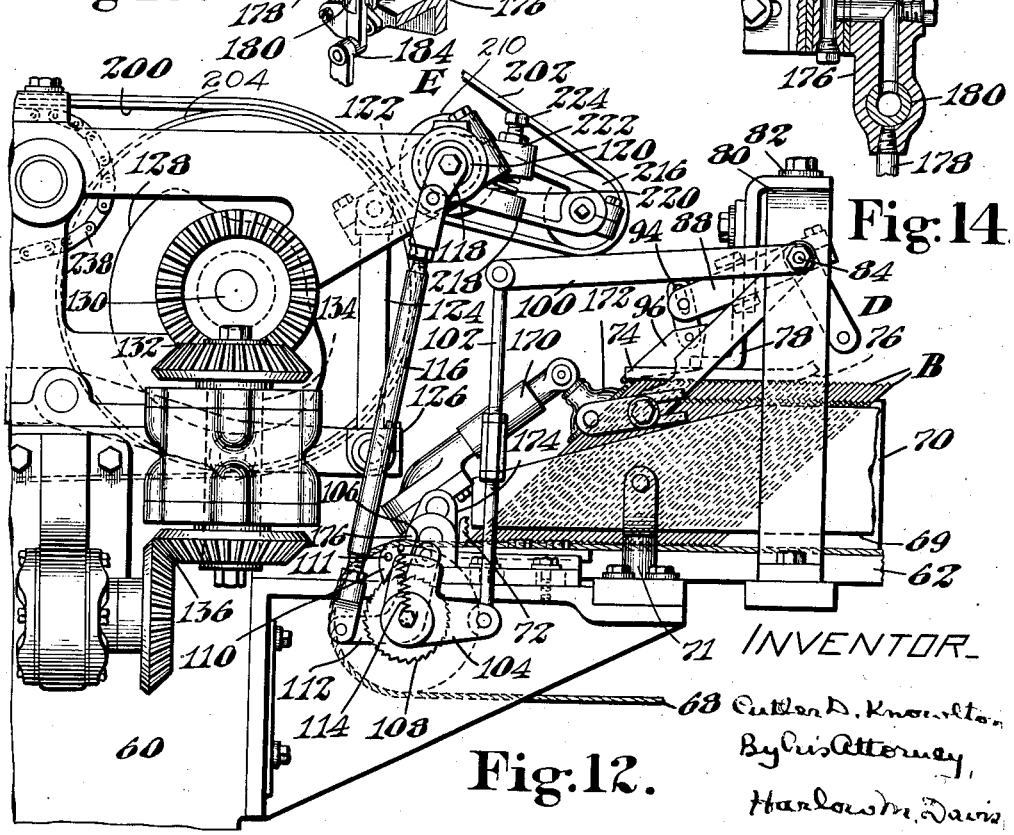
Fig. 14.
Fig. 12.
INVENTOR
Cutler D. Knowlton
By his Attorney,
Harlow M. Davis

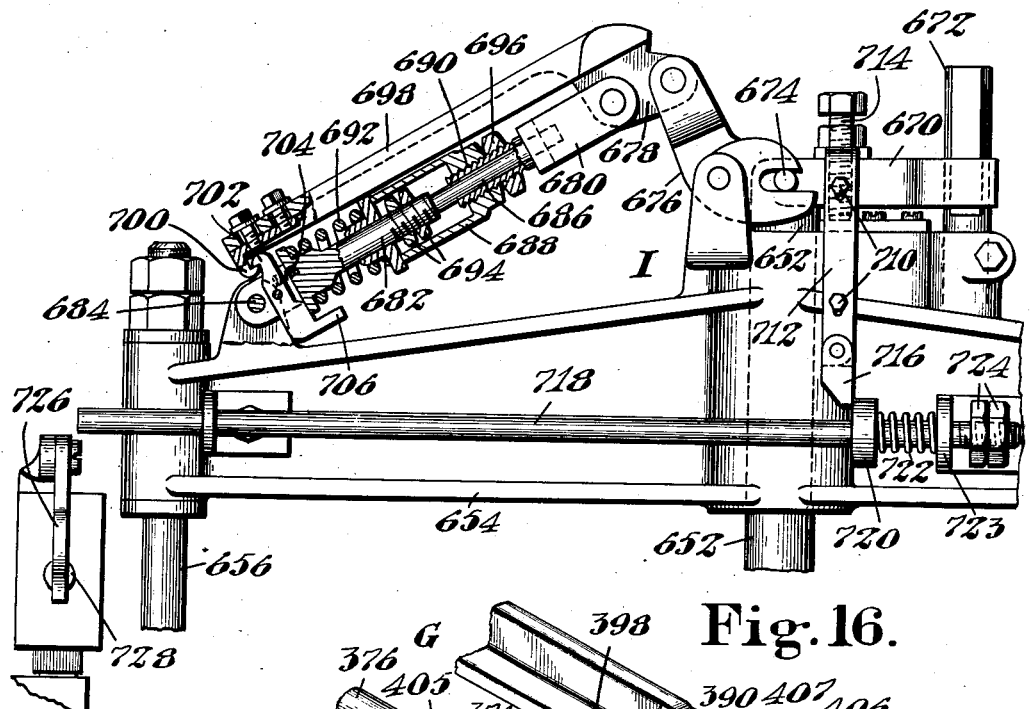
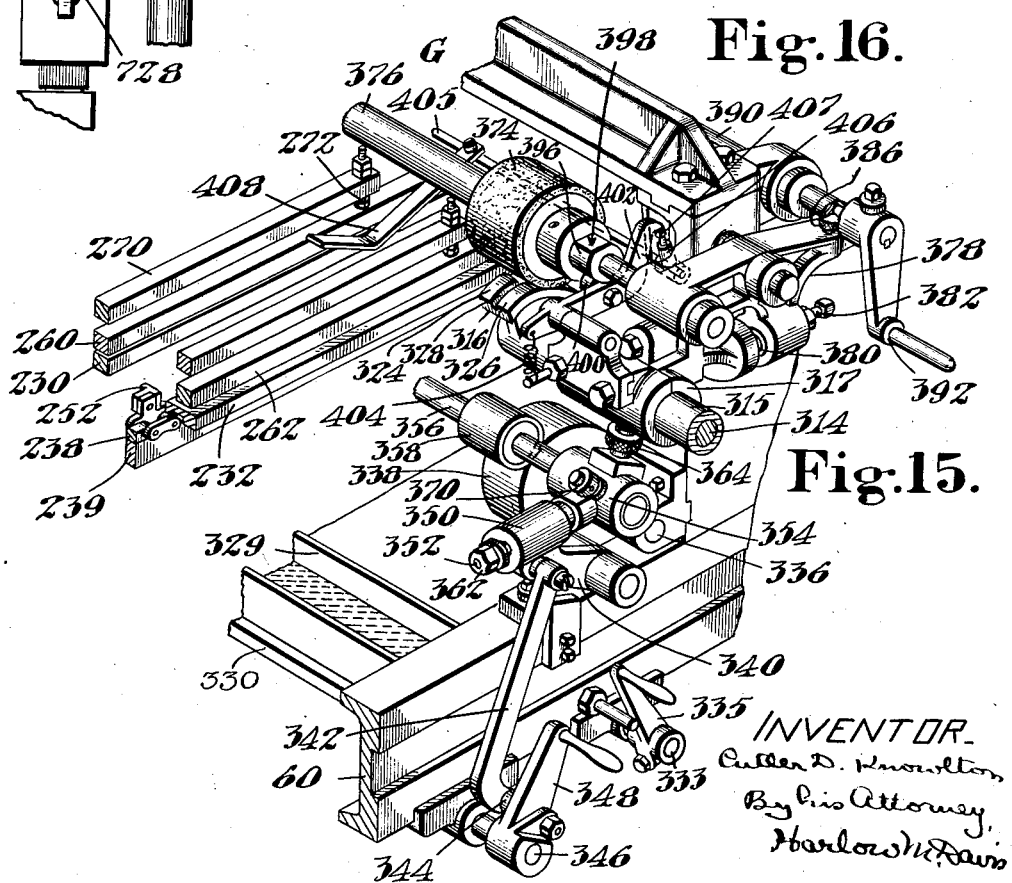
Fig. 16.
Fig. 15.

Jan. 22, 1935.  C. D. KNOWLTON  1,988,452
BOX MAKING
Filed July 7, 1930  13 Sheets-Sheet 10

Jan. 22, 1935.  C. D. KNOWLTON  1,988,452
BOX MAKING
Filed July 7, 1930  13 Sheets-Sheet 11

INVENTOR
Cutler D. Knowlton
By his Attorney
Harlow M. Davis

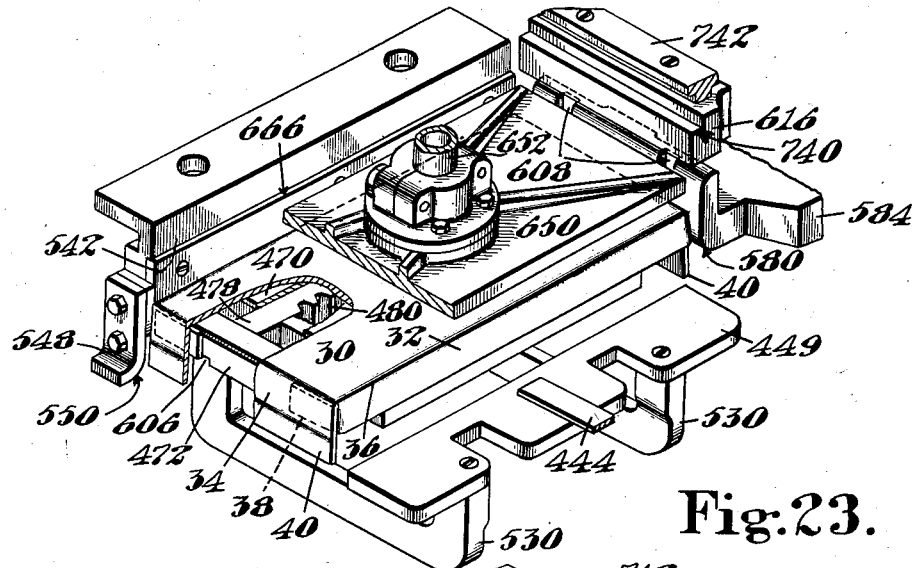
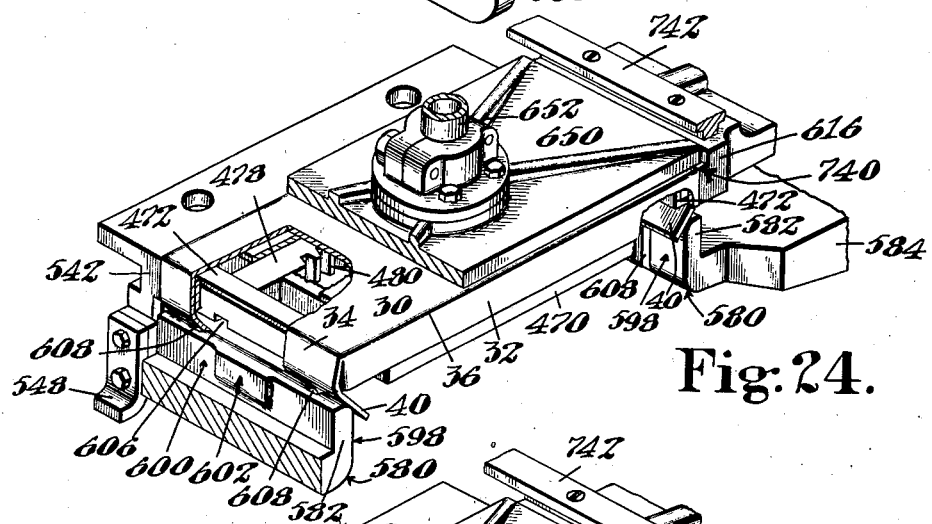
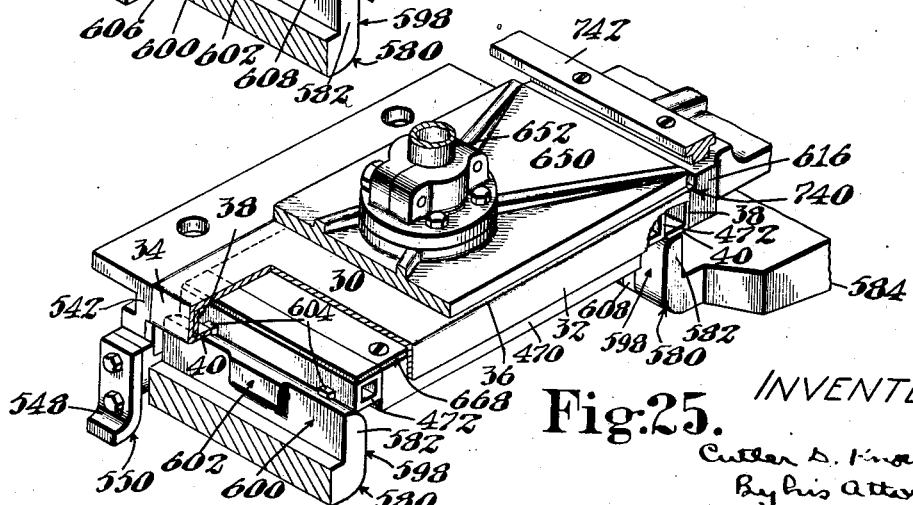

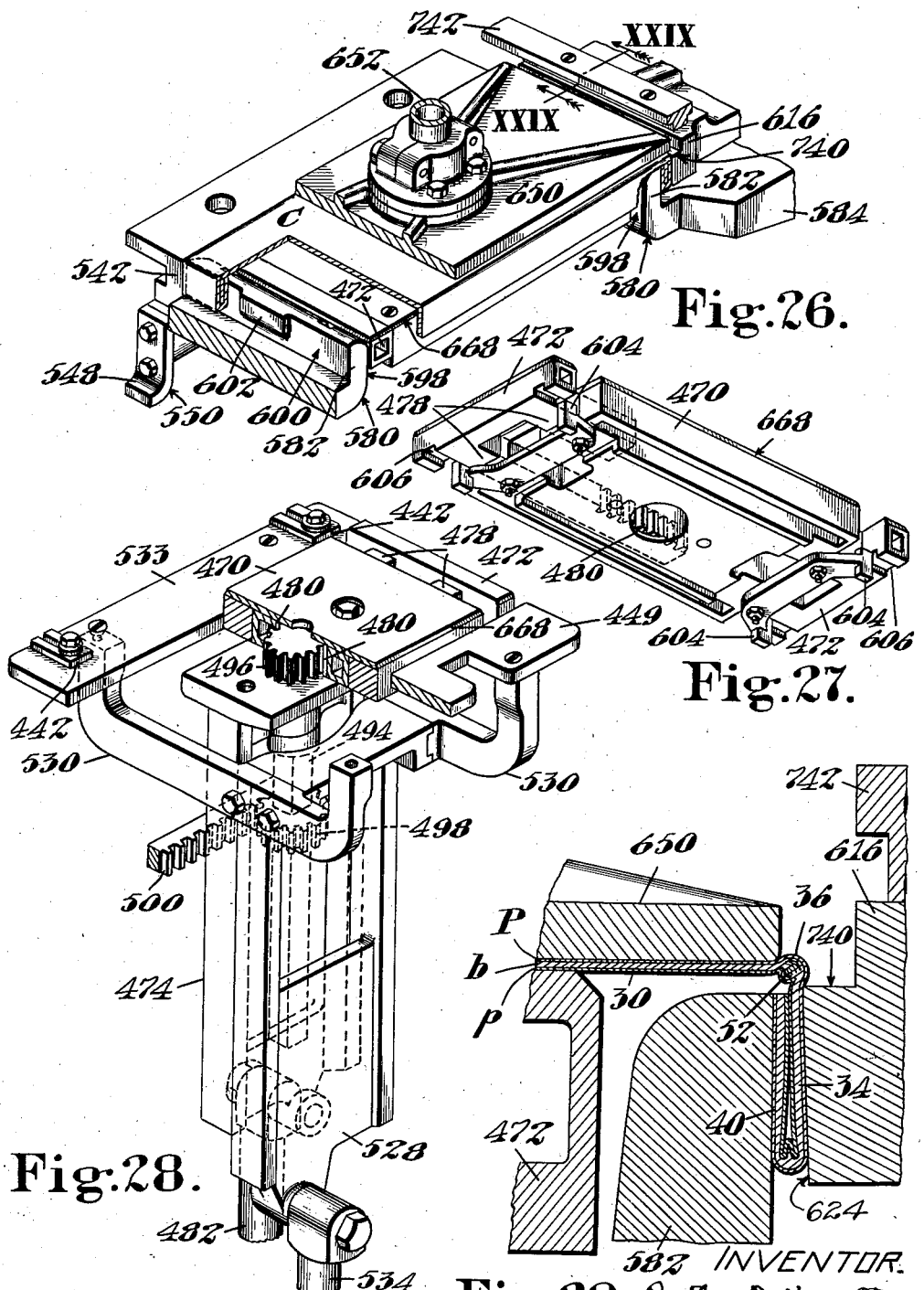

Patented Jan. 22, 1935

1,988,452

UNITED STATES PATENT OFFICE 1,988,452

BOX-MAKING

Cutler D. Knowlton, Beverly, Mass., assignor to Hoague-Sprague Corporation, Lynn, Mass., a corporation of Massachusetts Application July 7, 1930, Serial No. 465,941

167 Claims. (Cl. 93—51)

This invention relates to the making of boxes, this term applying to both the body-portion or container proper and the cover therefor, though the machine herein disclosed is best adapted for producing an article having the relative dimensions of a box-cover. More particularly is the invention concerned with the setting-up in box-form of previously prepared blanks.

An object of the invention is to effectively advance blanks to mechanisms which are to operate upon them, they being maintained in such relation during their travel that they will be properly delivered. In this connection the blanks are advanced by a conveyor, they are shown as receiving the support of rails, with which co-operates a yieldable pressure-bar holding the blanks constantly against displacement from the rails. I prefer to mount the rails and bar for transverse adjustment to obtain proper co-operation with blanks of different widths, the conveyor being adjustable with the rails.

An additional object of the invention is to guard unfailingly against improper action of the operating mechanisms upon the forwarded blanks, the performance of such operations being dependent upon the correctness of position of the advancing blanks. This is attained by providing means, controlled by the position of a blank under the influence of the conveyor, for stopping said conveyor or the machine as a whole. In either case, further advance of the blanks is prevented, until the operator has had an opportunity to overcome the defect, by discontinuance of the action. The particular means herein disclosed for giving such control includes a movable member or feeler and means, for example, a roll having a blank-receiving depression, normally holding advancing blanks out of engagement with the controlling member, displaced blanks contacting with the member and, through interposed connections, causing the action of a stop device. The illustrated organization for this last-mentioned purpose includes a lever, normally held inactive by a latch movable by the feeler member, said lever being released to operate a switch for an electric motor, or other stop device, when the feeler member is moved by an improperly positioned blank.

Another object of my invention is to improve the mechanism by which an adhesive is applied to each blank in preparation for its setting-up. The blank having been creased to facilitate its folding, deformation of the crease between areas to be coated is avoided by the use of a stencil member, between raised adhesive-applying surfaces of which is a depression for registration with the crease. A transferring roll, which is interposed between an adhesive-receptacle and the applying member, is so mounted upon levers that it may yield with respect to its associated members, and also has crank-connections by which it may be rendered active or inactive. By the latter feature, the cleaning of the mechanism is facilitated. The determine the amount of adhesive received by the transferring roll from a supply-roll in the receptacle and delivered to the applying member, the relation of said transferring roll with respect to the two associated members is independently adjustable, the adjusting means being so located as to render them conveniently accessible. A pressure-roll or member holds the blank in adhesive-receiving relation to the applying member, and, to permit the applying action to be stopped, one of the members is journaled in a lever, with which co-operates a shaft having a cam-portion acting upon the lever. Rotation of the shaft allows the members to be separated, so no application of the adhesive is made to the blank, or to approach each other to effect the coating. The applying means is normally effective, but, to prevent daubing the pressure member if the proper sequence of blanks is broken, I furnish means, acting in the absence of a blank at the applying means, for rendering said means ineffective, it being latched out of operating relation. This is shown as brought about by a feeler movable by the advancing blank, and governing means for preventing action of the applying means. To properly prepare for adhesion a surface which has been coated by the applying mechanism, I prefer to partially set the coating, to render it tacky, by subjecting it to the action of air issuing from an elongated slot in a conduit extending along the conveyor which advances the blank to the setting-up mechanism.

A further object is to effectively deliver each blank to the forming or setting-up mechanism. To this end, there is associated with the blank-advancing conveyor a novel organization for mounting and driving blank-engaging and delivering fingers. To insure proper contact between the blank and fingers or other delivering means, I have, in the present instance, caused retarding means, as a yieldable finger, to act upon the blank to a point beyond the maximum advance of the delivering means. When thus restrained, the blank can be displaced neither forwardly nor rearwardly from said means during its delivery.

At this point of delivery to the setting-up mechanism, a choking may occur, which, if the feed were not promptly arrested, would lead to the rapid accumulation of blanks forwarded. To thus stop the feed is an object of the invention, this being attained by employing means for testing, adjacent to the setting-up mechanism, the blanks advanced, and governing by this testing means a means for controlling the advancing means, as by stopping the machine. In the particular organization which I have chosen to illustrate, a feeler, movable by the blank or workpiece as it is advanced, governs a latch, which normally maintains inactive controlling means for the operating means. This control may be of a switch in the circuit of a driving motor for the machine.

Improvements in the setting-up of the blanks are effected by the use of such novel organizations as the following: An expansible form, over which each blank is folded, has a body-portion and end-portions, rack-and-pinion mechanism being utilized to expand and contract the form. A projection is carried by a portion of the form, bridging the space between it and another portion, this preventing inward collapse of the blank as it is folded. Blank-supports, movable independently of the form, retain one portion of each blank against displacement while another is being folded. One of these supports may give a surface over which the blank is introduced into the setting-up mechanism, while another may carry stops for determining the position of said blank. The supports appear as shelves carried by slides. Pairs of oppositely movable walls contact with the sides and ends of the blank to first fold its wings and thereafter to respectively apply pressure and cause the adhesion of the end-formations and to retain the intermediate walls from becoming deformed by this assembling pressure. The actuating connections for the latter walls are preferably yieldable. To fold blanks provided with end-wing extensions, I employ, in connection with the form or other movable blank-support, a member which performs the double function of receiving contact of a blank as it is moved by the support to fold the end-wing, and then itself moves to fold the extension. In this last action, the member enters between the blank and form, the latter being at this time contracted. There, it also acts and thus has still a third function, as a pressure-abutment co-operating with an external pressure member. Because the form is not called upon to resist pressure, it may be relatively light and may be operated at a high speed. To permit the introduction of the folding member without interference with the previously mentioned collapse-preventing projection of the form, the folding member has a depression to receive this projection. Herein, the folding member appears as provided with a hooked blank-engaging end, upon which is a pressure-equalizing projection opposite the outer pressure member.

Improvements in the means for applying setting pressure to the end-formation of the set-up boxes include the manner of supporting, actuating and adjusting the outer pressure members and associating them with the inner pressure members just referred to. This pressure is obtained, without deforming the crease between the end-wings and their extensions, by box-contacting surfaces of the inner and outer pressure members diverging from each other, they being most widely spaced adjacent to the crease.

Since, in the creases formed in a box-blank, the laminæ adhere in such a way as to throw upon the set-up blank stresses tending to cause the sidewalls to bulge and thus distort the box produced from it, an object of the invention is to prevent this effect. This is attained by employing a novel method of operating upon the blank during its setting-up and mechanism by which such method may be performed. In accordance with this method, pressure is exerted upon each blank after it has been converted into box-form over an area adjacent to the crease, upsetting said crease to release the stresses in the laminæ. Movement of the blank is resisted at the opposite side of the crease during the application of this pressure. This effect is best obtained by applying pressure at opposite sides of the crease, as by holding the peripheral walls of the box against flexure while exerting upon the body-portion pressure in a direction tending to force it between said walls. A means useful for performing the above method comprises a support for a creased blank, as the form over which it is being folded, and co-operating abutment means for separating the laminæ of the blank at the crease, the support and its co-operating means engaging the interior and exterior of the box being formed. These together clamp and move the box at one side of the crease, as over the body-portion, while at the opposite side of said crease the other portions or peripheral walls of the box are prevented from moving under the influence of the clamping members, as by means contacting with their edges. The form and abutment also have utility during the introduction of the blank to the setting-up mechanism and before the upsetting action, when the feeding means urges the blank against its locating stop. Their guidance of the blank while they are at this time spaced from each other prevents its displacement. The box produced in accordance with this method of setting up a blank and by the present mechanism is made the subject of an application Serial No. 480,517, filed in my name in the United States Patent Office on September 8, 1930.

Another object of the invention is to prevent injury to the elements of the setting-up mechanism during the exertion of such pressure as that just mentioned for upsetting the crease. In the achievement of this object, the pressure member is made yieldable, and this yield is controlled by means which may be automatically released during the application of pressure if the resistance, which may arise from action upon a plurality of blanks at one time, becomes excessive. For this purpose, I have illustrated connections for moving the member, together with means for breaking these connections, the particular means shown involving the release from a latch of a lever included in the connections. The assumption of an abnormal position of an element of the setting-up mechanism, as just described, may be caused to stop the operating means for the machine, so the originating condition may be corrected. In the present instance, this result is obtained by connections to the previously mentioned controlling means, they releasing a latch for a contact member, which, in turn, actuates a stop device for an electric motor or other operating means.

I also furnish, as an object of this invention, means for facilitating the removal of a folded or formed box from the setting-up mechanism. This includes the forming instrumentalities, for example, forming and folding walls, and a supporting member, which is shown as that for applying pressure to the end-formations. Movement of the form produces the folding, and further movement brings the formed box into cooperation with the support, which thereupon may be moved to engage the box. This may be followed by the withdrawal of the form and the ejecting of the box. The ejecting means I prefer to mount movably upon the pressure members, the box being delivered over the surface of one of the folding walls. It is best received by a chute leading to a trough, in which operates a conveyor. Injury to the work or the machine is guarded against, in event of clogging at this conveyor, by connections between it and its driving means, such connections being arranged to separate when a predetermined resistance to operation is encountered, and to stop the driving means of the machine.

In a divisional application Serial No. 715,330, filed March 13, 1934, is disclosed and claimed the feeding mechanism by which blanks are initially delivered to the operating mechanisms.

One of the many forms which my invention may take is illustrated in the accompanying drawings. In these, Fig. 1 is a top plan view of the entrance-end of my improved machine;

Fig. 2 is a similar view of the delivery-end;

Fig. 3 shows in side elevation that portion of the apparatus appearing in Fig. 1;

Fig. 4 is an enlarged broken side elevation of mechanism for testing the blanks as they are advanced for the operations upon them;

Fig. 5 is a side elevation of the end of the machine appearing in Fig. 2;

Figure 8:
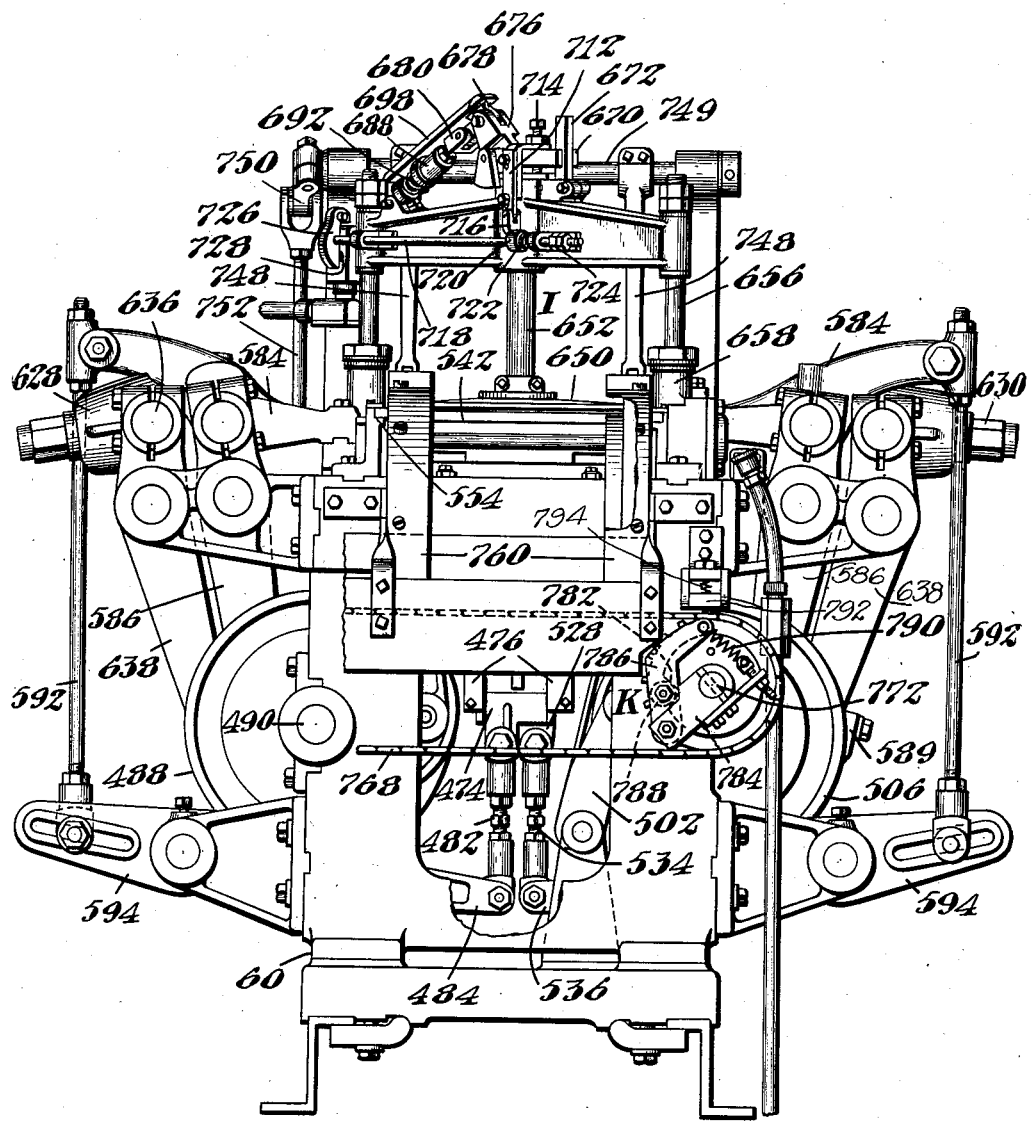
Figure 9:
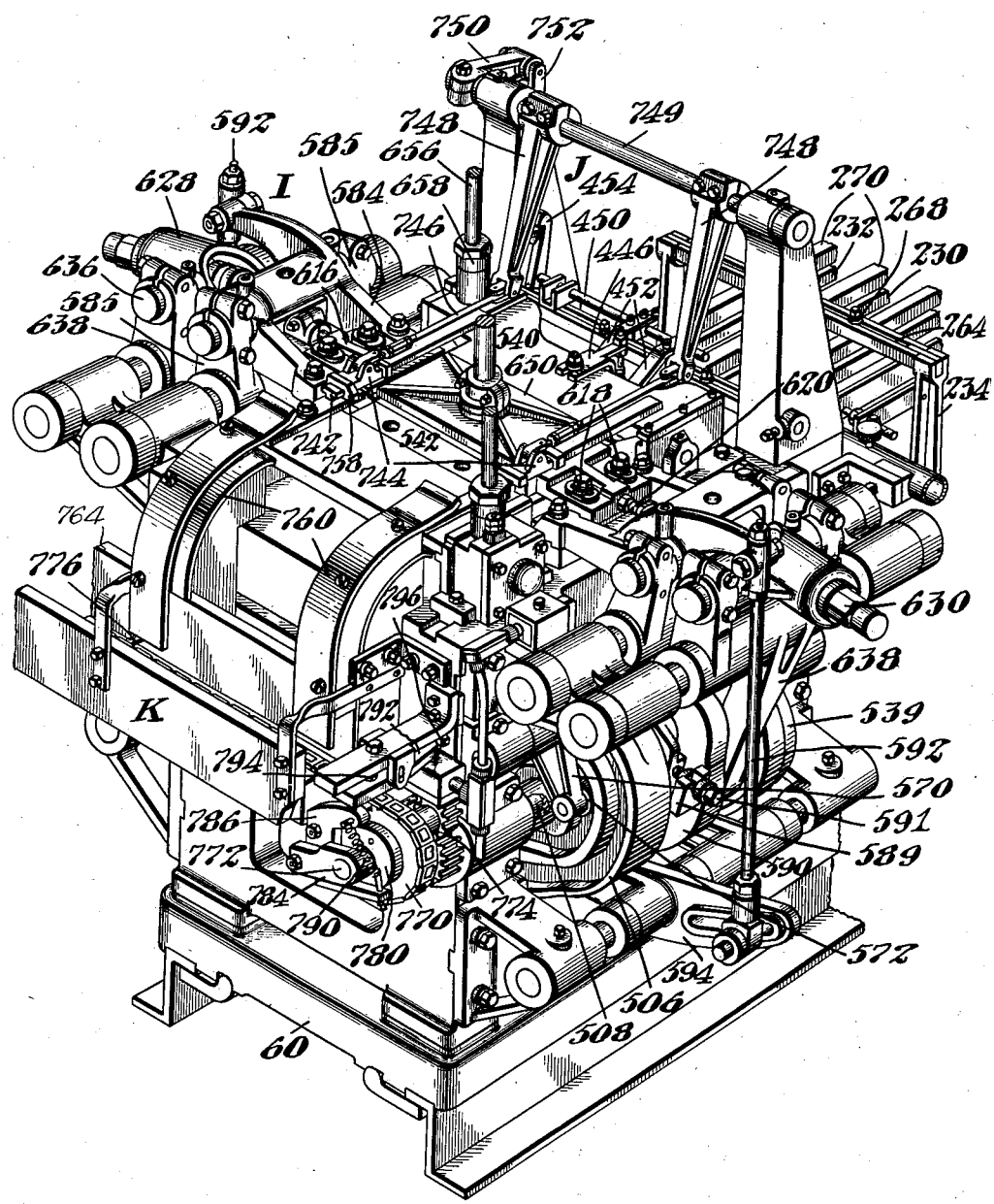
Figure 10:
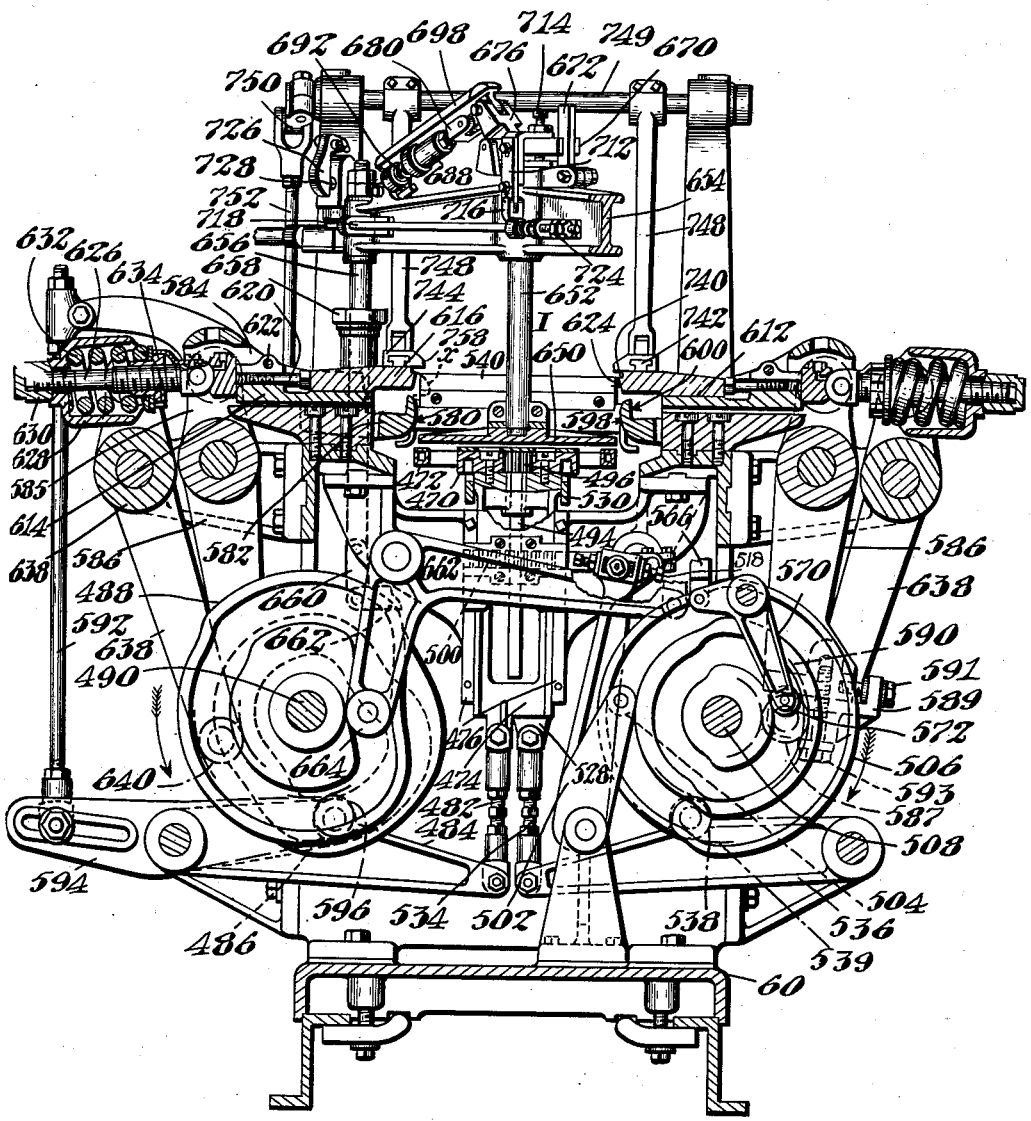
Figure 11:
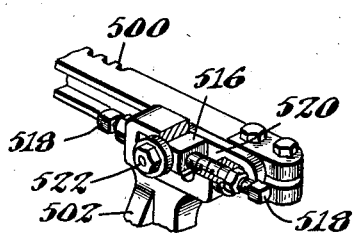
Figure 17:
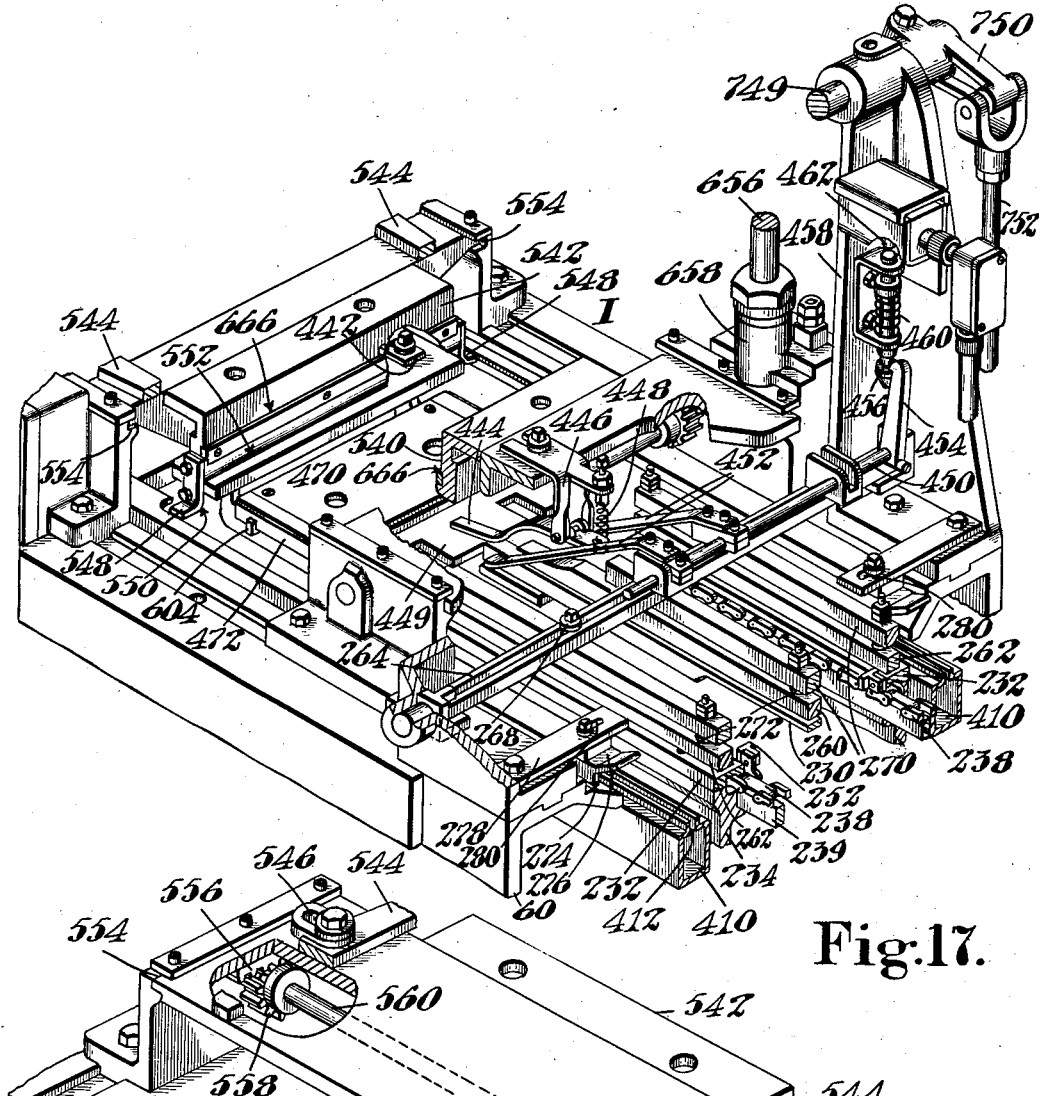
Figure 18:
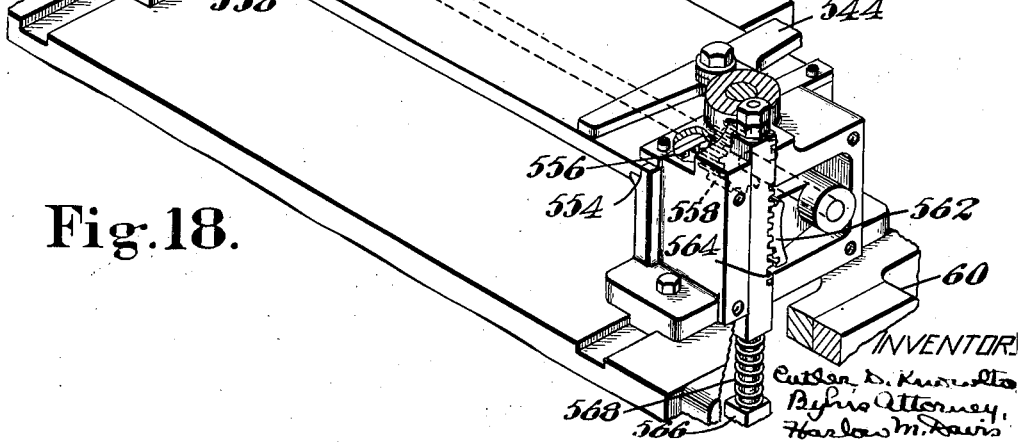
Figures 19, 21:
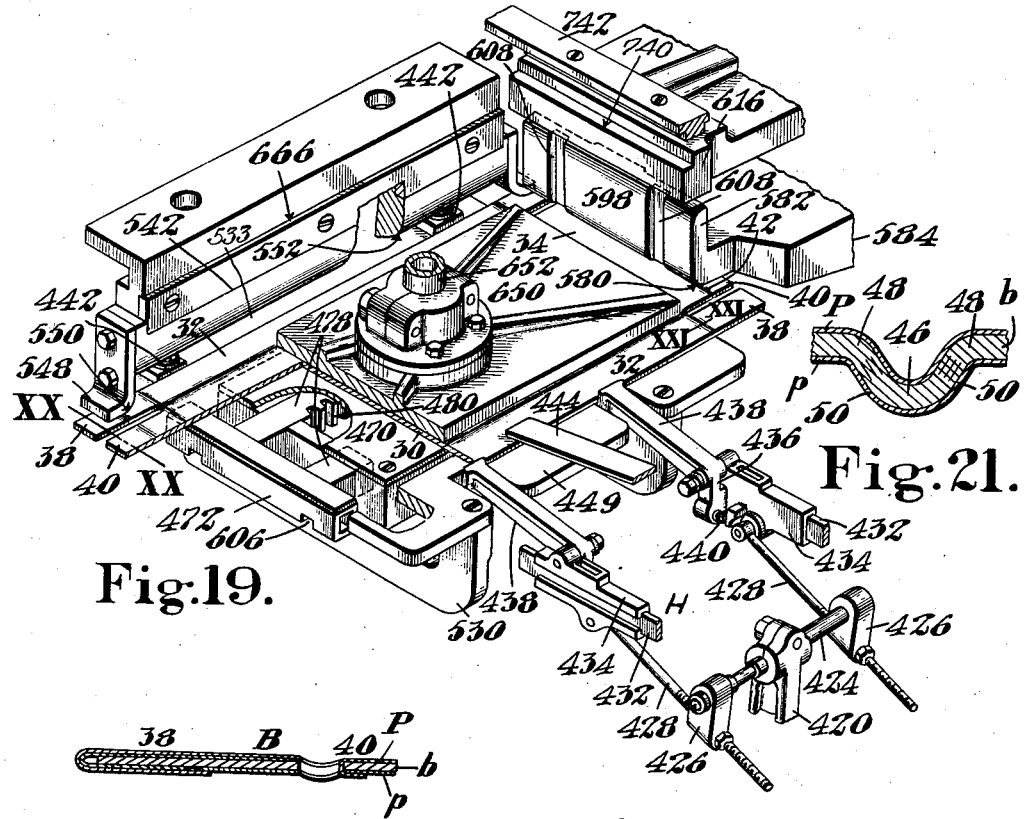
Figures 20, 22:
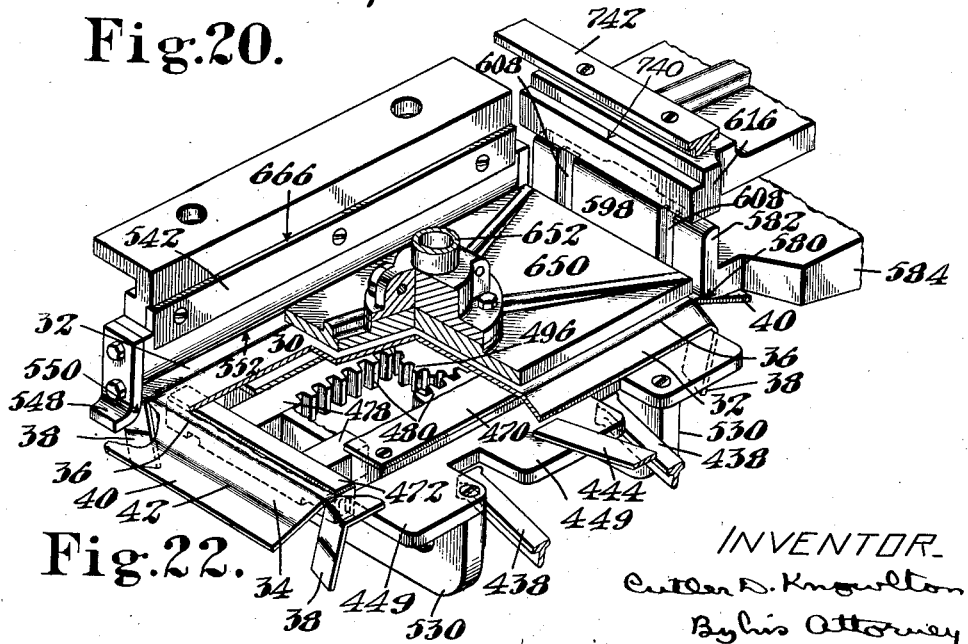

In Fig. 6 is illustrated the gluing mechanism in enlarged broken side elevation;

Fig. 7 shows in perspective the driving means for portions of said mechanism;

Fig. 8 is an end elevation of the machine at the point of delivery of the completed covers;

Fig. 9 is a perspective view of this delivering portion;

Fig. 10 is a transverse vertical section on the line X—X of Fig. 2;

Fig. 11 is a detail in perspective of a portion of the connections by which the form-ends in the setting-up section of the apparatus are expanded and retracted;

Fig. 12 shows in enlarged broken side elevation portions of the blank-holding and transferring mechanisms;

Fig. 13 is a perspective view of a portion of the mechanisms of Fig. 12;

Fig. 14 illustrates in section the suction-connections for the transferring device;

Fig. 15 shows the gluing mechanism in broken perspective;

Fig. 16 is a broken side elevation of the releasing mechanism associated with the pressure-plate of the setting-up section;

Fig. 17 is a broken perspective view of the setting-up section taken from the incoming side and including blank-testing means;

Fig. 18 develops in perspective the manner of moving in and out the side-walls associated with the form;

Fig. 19 illustrates in broken perspective the setting-up section and feeding means therefor;

Fig. 20 is an enlarged sectional detail through a portion of a blank taken on the line XX—XX of Fig. 19;

Fig. 21 is a similar view on the line XXI—XXI of Fig. 19.

Figs. 22, 23, 24, 25 and 26 show in broken perspective successive steps in the folding of a cover from a blank;

Fig. 27 is a perspective view disclosing the under side of the form;

Fig. 28 illustrates in broken perspective the manner of supporting and actuating the form and certain of the more directly associated elements; and Fig. 29 is an enlarged sectional detail on the line XXIX—XXIX of Fig. 26.

The blank upon which the apparatus disclosed is intended to operate, and which may be for the production of box-covers, is shown at B in Fig. 13 of the drawings. It may consist of shell-material $b$ (Figs. 20 and 21), of pasteboard or the like, provided, if desirable, with an outer layer of cover-paper P and an inner layer $p$ of lining-paper adhesively secured to the shell. This blank gives a main or body-portion 30, rectangular in its general form and having at its longer edges side-wings 32, and at its shorter edges end-wings 34, the connection of both sets of wings to the body being defined by creases 36. Projecting from the ends of each side-wing are corner-laps 38, 38, while each end-wing has an extension 40. Between the side-wings and corner-laps are extensions of the end-creases 36, and between the end-wings and their extensions are creases 42. When the setting-up of the cover C is completed, as appears in Figs. 26 and 29, the four wings lie at right angles to the body-portion, the corner-laps are folded within the end-wings and secured adhesively thereto, and the extensions are turned in and similarly attached to the inner faces of the corresponding end-wings and corner-laps. The creases are preferably of the pinch type (Fig. 21), in which material is forced out beyond the inner or lining face of the blank into an elongated projection, which has, at the outer or cover-face, a corresponding depression. In the production of this crease, there is no elongation of the material, it being merely shortened between its ends. In the change of form, the laminæ of the board remain joined to one another at the apex 46 of the crease and at each of its sides 48, 48, and slip over one another at intermediate points 50, 50. Hereinafter there will be described the manner in which I overcome defects which tend to develop in setting up a cover thus creased.

In the production of the cover C, the blank B comes successively under the influence of a series of mechanisms situated at different operating positions. Mechanism D (Fig. 3) furnishes a magazine or means for holding a stack or series of the blanks and for delivering the terminal blank to transferring mechanism at E. The mechanism at E takes the blanks one by one from the series and transfers them to conveying means of a delivering section F located at a higher level than the holder D. At G, the conveyor passes the blank through mechanism by which some such adhesive as glue is placed upon the inner side of each end-wing-extension and upon portions of each end-wing. Feeding mechanism at H (Fig. 5) forwards the thus-glued blanks from the delivering conveyor into a setting-up mechanism I, in which the formation of the cover is completed, and ejecting mechanism J removes the cover from the setting-up mechanism and delivers it to a conveyor K, by which it may be carried away from the machine.

Referring particularly to Figs. 1, 3, 12 and 13, the main frame 60 of the machine has, at the entering end, an extension 62, at the opposite extremities of which are journaled horizontal shafts 64, 64 having fixed upon them grooved pulleys 66 spaced regularly from one another. Over the opposite series of pulleys passes a conveyor 68, which may consist of an endless rope. The conveyor 68 supports a series of the blanks B, the rear blank resting in a rearwardly and upwardly inclined position against an abutment member 70 carried by the conveyor. At the sides of the conveyor, the blanks are positioned by adjustable edge-gages 69, 69 extending between brackets 71. The lower forward edge of the leading blank is limited in its advance, under the influence of the conveyor, by stops 72 projecting vertically from the frame-extension 62 adjacent to the transferring section E. Above and parallel to the conveyor 68 is a horizontal guide-bar 74, with an upwardly inclined end 76 furnishing an entrance-throat. This maintains the upper edges of the blanks at a substantially constant level. The bar is mounted upon a sectional bracket 78 depending from a bridge 80, the bracket preferably having slot-and-screw connections 82 to the bridge and between its sections, so the relation of the blank-engaging surface of the guide-bar to the conveyor may be adjusted both horizontally and vertically.

It is desirable to maintain the leading blank of the series in an approximately constant plane, to facilitate its proper removal by the mechanism E. This is effected by control of the operating mechanism for the conveyor 68 by means acted upon by the blanks. Because of different conditions attending the blanks, as the character and extent of the cover- and lining-paper applied to them, they may be curved longitudinally, or about a transverse axis, with the leading side of the stack either convex or concave. In the first instance, the central portions of the side-wings will be in advance of the end-wings; in the second, the end-wings will lead. To bring a portion of the blank-body near its center to a mean position, which will be approximately the same for all blanks, blank-engaging members of the controlling means are arranged for contact with both the top and the ends of the foremost blank. Journaled in the uprights of the bridge is a carrier shaft 84, having fixed to it, near its center, an arm 86. Adjacent to this, and loose upon the shaft, is an arm 88, free to play between lower and upper stop-projections 90, 90 from the arm 86. A spring 92 holds the arm 88 normally against the lower projection. Fixed to the forward extremity of the arm 88, for vertical and angular adjustment by a slot-and-screw connection 94, is a finger 96 provided with an end 98 lying somewhat below the blank-engaging surface of the bar 74. Upon one end of the shaft 84 is secured an arm 100, joined by a connecting-rod 102, adjustable as to length, to a bell-crank lever 104 fulcrumed upon the forward shaft 64 of the conveyor. A vertical arm of the lever has an arcuate end 106, serving as a shield for a ratchet-wheel 108 fast upon the shaft 64. Cooperating with the ratchet-wheel is a pawl 110 pivoted upon a lever 112 mounted to oscillate about the shaft 64. A projection 111 from the side of the pawl may receive the contact of and be lifted by the end 106 of the lever 104. The pawl is held normally against the wheel by a spring 114, and is oscillated through a connecting-rod 116 joined to the lever 112 and to an arm 118 fixed to a shaft 120 journaled horizontally at the top of the frame. A second arm 122 on this shaft is united by a connecting-rod 124 to a lever 126 fulcrumed in a lower plane, the lever being oscillated by a cam 128 upon a shaft 130 journaled across the rear end of the main frame 60. A spring 131 (Fig. 3), connected to the lever, maintains its co-operation with the cam. From the shaft 130, the chain of driving elements runs through bevel-gearing 132 (Fig. 12), a vertical shaft 134, bevel-gearing 136, a horizontal line-shaft 138 (Fig. 1), bevel-gearing 140, a transverse shaft 142 (Fig. 5), reduction-gearing 144 (Figs. 3 and 5), a shaft 146 and sprocket-gearing 148, to a motor 150. The shaft 84 also has secured to it, at points above the outer edges of the blanks, arms 152, 152, each provided with an end-section 154 adjustable by slot-and-screw connections 156. Extending horizontally from these end-sections, and adjustable as to their longitudinal extension by set-screws 158, are fingers 160 lying in the path of the ends of the blanks.

The operation of the stack-controlling mechanism is as follows: Until the foremost blank reaches and moves either the finger 96 or the fingers 160 to a predetermined extent, the weight of these fingers and the elements movable with them so holds the lever 104 that the shield-portion 106 is removed from the projection 111, thus allowing the pawl 110 to engage the teeth of the ratchet-wheel 108. Consequently, the continuous oscillation of the lever 112 rotates the shaft 64 steadily and gradually advances the stack of blanks toward the transferring mechanism E. If the blanks are laterally convexed, the upper central portion of the forward blank will reach the finger 96 before the ends contact with the fingers 160, and will force said finger 96 up. This, through the intermediate connections, shifts the shield 106 until its contact with the projection 111 raises the pawl from the ratchet-wheel. The movement of the conveyor 68 therefore ceases, the forward blank of the stack resting against the stops 72. If the curvature of the blanks is opposite, with the concave side forward, the ends will act similarly through the fingers 160. In either case, a feed of the stack is maintained until that area of the body-portion 30 of the blank which is to be engaged by the transferring mechanism is in the desired position, and this relation will be automatically maintained. After a certain angular displacement of the arms 86 and 152 by the forward blank, the movement of the fingers will be arrested by projections from arms 166 fixed to the shaft 84 and striking against the bridge-supports. Now the fingers 160, and to some extent the yieldable finger 96, will resist the advance of the blank-edges by the transferring mechanism, causing said blank to buckle and thus altering its curvature. This admits air between the blank acted upon and that succeeding it in the stack, and breaks the adhesion due to atmospheric pressure. The removal of a plurality of the blanks at one time is thus guarded against. This separating effect may be increased by dividing the end 98 of the finger 96, as appears in Fig. 13. As the edge of a blank passes beneath the multiple projections, they produce repeated impacts, this increasing the efficiency of the adhesion-breaking means.

Considering now the transferring mechanism E (Figs. 3, 12, 13 and 14), there is mounted to swing in front of the stops 72, a pipe 168 bearing near its center a tubular arm 170, which carries a suction-nozzle 172, adjustable as to angle upon the arm and preferably formed of rubber or other yieldable material. The pipe is secured in arms 174, 174 pivoted upon the frame, the pivot of one of these arms being tubular and communicating with a casing 176, to which suction is applied through a pipe 178. The axis about which the arms turn is in close proximity to, or may be made to coincide with, the lower edge of the forward blank B to be transferred, as it rests against the stops 72. Associated with the casing is a valve 180 (Fig. 14) operated at appropriate times, against the force of a spring 182, by connections 184 acted upon by a cam 186 rotated by the shaft 130. The pipe 168 and its arm 170 are rocked between a blank-removing position at the stack (Figs. 12 and 13) and a blank-delivering position by a rod 188 joined to one of the arms 174 and passing through an opening in a lever 190 fulcrumed about the same center as the lever 126 and urged by a spring 192 into co-operation with a cam 194 upon the shaft 130. In the movement of the lever which causes the engagement of the nozzle with the blank, the force is transmitted through a spring 196 surrounding the rod 188, allowing the nozzle to yield and thus insure firm contact. When the nozzle 172 is thus pressed against the terminal blank upon the conveyor 68, the suction is set up under the control of the valve 180, and the blank is drawn from beneath the feeler-fingers 98 and 160 by forward movement of the arm 170. This delivers the blank upwardly against two spaced endless belts 200, 200, and below oscillating portions of two corresponding belts 202, 202. The pairs of belts 200, 202 are shown as side by side, equally separated at opposite sides of the suction device. Each belt 200 passes about a fixed axis over a large pulley 204 fast upon the cam-shaft 130, and by it is driven horizontally about an idle pulley 206 and down beneath a tightening pulley 208. The belts 202 are preferably not driven, but each is guided in contact with a portion of the opposite belt 200, where it surrounds the pulley 204, by a roll 210 turning about the shaft 120, and continues horizontally with said belt over a guide-pulley 212, and then about a tightening pulley 214 and an oscillatory pulley 216. Movement of the angular receiving ends of the belts 202 by the pulleys 216 produces a grasping of the blank between said belts and the belts 200 and its removal from the suction device. Each pulley 216 is rotatable upon an arm 218 carried by the shaft 120. When each arm is oscillated by the shaft under the influence of the cam 128, it is capable of yielding as its belt 202 contacts with the blank, it having a limited angular movement against the resistance of a spring 220 interposed between it and an arm 222 fast upon the shaft. The resistance of the spring, and thus the degree of pressure of the belt upon the blank, may be varied by a screw 224 threaded through the arm 218, and against which the spring abuts. As the suction device 172 brings the upper edge of the blank which it engages against the belts 200, the arms 218 descend and force the belts 202 against its outer side, wrapping said belts about it. At this time, the suction is cut off by the valve 180, and thereafter the device 172 returns to the stack to transfer the succeeding blank therefrom. As soon as both the pairs of belts 200, 200 and 202, 202 have grasped the forward extremities of the blank, they feed it forward between those portions which are in constant contact. This permits the arms 218 to restore the oscillatory ends of the belts 202 to their initial relation, ready to act upon the next blank. During the movement of the blank by the suction device, its lower edge is displaced but slightly, if at all, from the conveyor 68, said blank substantially turning about this edge as an axis. Therefore, there is no opportunity for angular displacement of the blank upon the head 172. The initial movement of one edge only of the blank also better breaks its adhesion to the succeeding blank.

Figure 1:
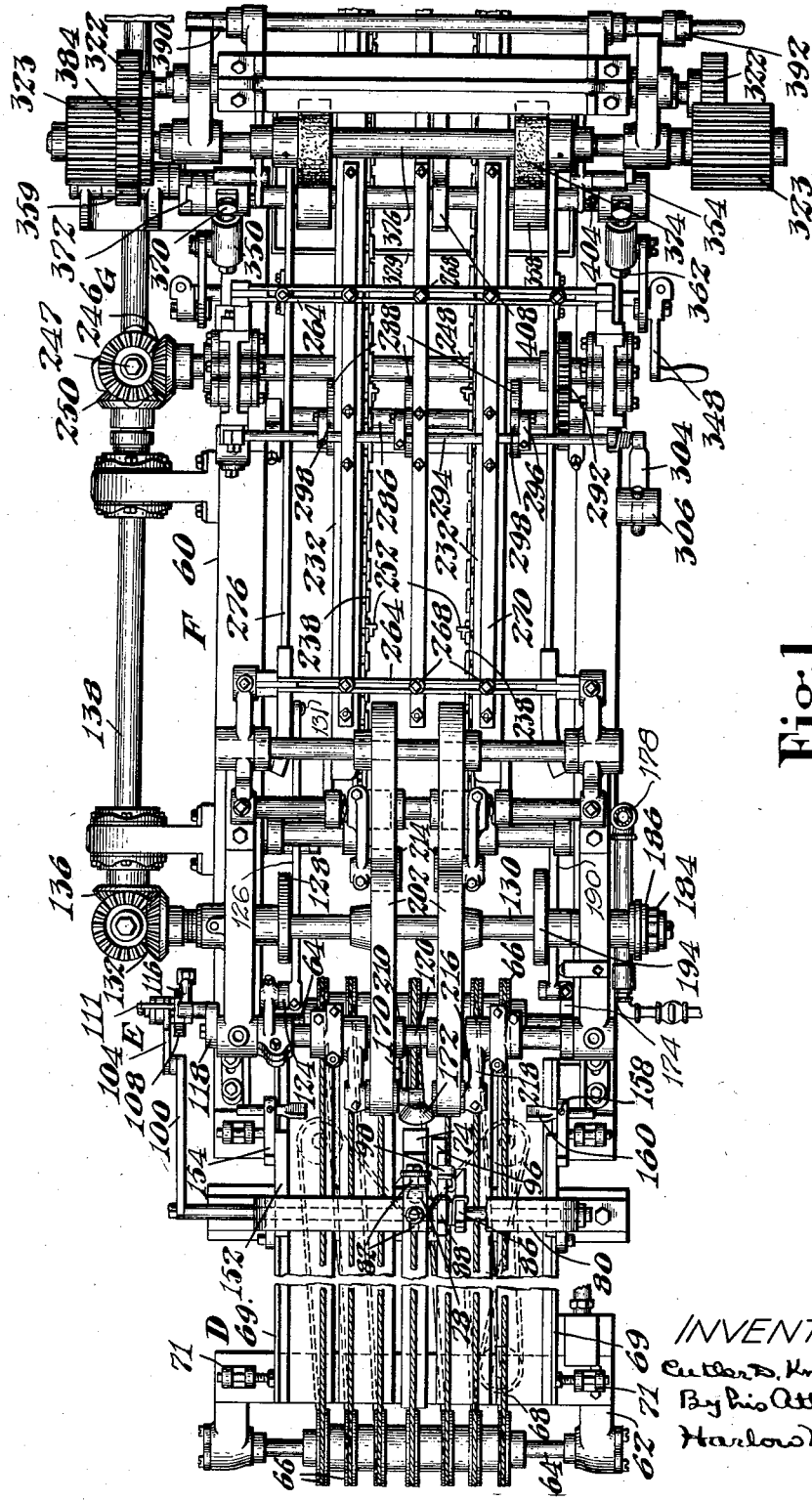

When the transferred blank leaves the section E with what is to be the outside or top of the cover upmost, it enters the conveying section F. Here, the blank is received upon horizontal supporting rails 230, 232, 232, the first of these extending longitudinally of the center of the frame 60 and the other two being equally spaced at each side (Figs. 1, 3 and 17). Brackets 234 support the rails, these brackets being fixed by set-screws to transverse rods 236. This mounting permits the rails to be adjusted to different points across the frame to best adapt them for the support of different sizes of blanks. Along these rails the blanks are advanced by chains 238 traveling at the inner sides of the rails 232. The chains operate over pairs of sprocket-wheels 240, 240 secured to horizontal shafts 242, 242 journaled respectively in the frame 60 just in advance of the transferring mechanism E and of the feeding mechanism H, respectively. These chains are adjustable with, and thus maintained in constant relation to, the rails 232, by their support upon bars 239 carried by the brackets 234 below the rails. Between their ends, the chains engage the teeth of sprocket-wheels 244, 244 (Fig. 3) fast upon a shaft 248 journaled across the frame. Bevel-gearing 246, a vertical shaft 247 and bevel-gearing 250 (Fig. 1) join this shaft to the line-shaft 138. Series of lugs 252 extend from the inner side of each chain and engage the successive blanks at the rear outer corners, as they leave the belts 200, 202, the transferring mechanism E being driven in synchronism with the chains. Guiding sprockets 254 (Fig. 5) and tightening sprockets 256, the latter carried by arms 258 (Fig. 3), also engage the chains to insure their proper operation. To keep the blanks in place upon the rails to receive the contact of the lugs, there is situated above the center rail 230 a retaining or pressure-bar 260, and above the side-rails 232, retaining bars 262, 262. The first of these preferably rests lightly upon the blanks, while the side-bars normally just clear said blanks. This arrangement avoids any tendency to twist the traveling blanks upon the rails as a result of contact with one margin only. All the retaining bars are mounted upon transverse supporting bars 264 and are adjustable, by slot-and-screw connections 268, to correspond to the transverse positions of the rails. To avoid breakage if superposed blanks become wedged between the rails and bars, the latter are shown as yieldable, they being directly carried by longitudinal bars 270 with interposed springs 272. The connections 268 of the retaining bars to the transverse bars are through the interposed bars 270. To locate the blanks in the proper transverse relation to the rails, and thus to the mechanisms which are to operate upon them, I provide vertical edge-gages 274, which, at portions of the course of the blanks, may have overhanging horizontal retaining walls 276. Bars 278 across the frame carry these edge-gages, slot-and-screw connections 280 permitting them to be positioned in accordance with the length of the blank being operated upon.

After the blanks have been delivered by the transferring mechanism E to the chains 238 in section F, and before they are operated upon by any of the succeeding mechanisms, they are preferably each tested during their advance as to the number contacting with each pair of chain-lugs 252 and for their symmetry as to position upon the rails 230, 232. Rotatably mounted across the frame, below the upper or conveying run of the chains, is a shaft 286, on which are secured three bed-rolls or disks 288 (Figs. 1, 3 and 4), one of these being located near the rail 230 and the others, respectively, adjacent to the rails 232. In the periphery of each disk is a depression 290 of such length that a blank may lie within it. The depth of the depressions is substantially equal to the thickness of the blanks. The shaft 286 is rotated by spur-gearing 292 from the conveyor-shaft 248. The depressions 290 are horizontally alined in the three disks, and the rotation of the disks is so timed with the travel of the chain-lugs that single blanks normally positioned against the lugs will be received by the depressions and will not project beyond the peripheries of the disks. Turning upon the frame, above the disks, is a spindle 294, to which are fixed three arms 296, upon each of which arms a feeler-roll 298 is rotatable and is held by a spring 299 in contact with the disks or with the blanks passing over these. With the feeler-rolls resting in this way, a latch-arm 300 fast upon the spindle 294 is held above a contact-screw 302 projecting from the horizontal arm of a bell-crank lever 304, and holds said lever against movement by a weight 306 upon an upwardly extending arm. If, however, blanks positioned between the disks and rolls are overlapped or are turned from their correct angular relation upon the rails, they will not lie wholly within the depressions 290, but will extend outside these, considered radially of the disks, and consequently will lift the rolls 298. This, moving the arms 296, causes the latch to be withdrawn from the lever 304, and, thus released, it is swung by the weight 306 so that a projection 308 from it is brought against a button 310 controlling the driving motor 150. The depression of the button opens the motor-circuit and stops the apparatus, so the abnormal conditions may be corrected before the malpositioned blanks reach the operating mechanisms and cause damage.

The first operation upon the blanks in the illustrated machine is to apply glue to the area at each extremity of each end-wing 34 with which a corner-lap 38 is to contact, and also to the entire inner face of each end-wing-extension 40. This is accomplished by the mechanism G (Figs. 1, 3, 6, 7, and 15). Spaced horizontal shafts 314, 314, situated at opposite sides of the frame below the plane of the rails 230 and 232, carry glue-applying members, in the form of segments 316, 316, so located as to register with the areas to be coated at the opposite ends of the blanks. The bearing-sleeve 315 of each shaft 314 is adjustable transversely of the frame, being clamped in a divided support 317. By this arrangement, the segments may be adapted for co-operation with blanks differing in length. Sprocket-gearing 318 joins the shaft 142 to a shaft 320 journaled below the shafts 314, pairs of spur-gears 322, 323 respectively connecting the segment-shafts to the shaft 320. Each gear 323 is elongated, so it will remain in mesh with the gear 322 during the transverse adjustment of the segments. The applying face of each segment is of the stencil type, having raised areas 324 and 326, which are caused to register, respectively, with the end-wing-portions and end-wing-extensions as the shaft 314 is rotated in synchronism with the presentation of the blanks by the chain-lugs 252. A depression 328 in each stencil-face between the portions 324 and 326 avoids the application of pressure to and a consequent distortion of the crease 42 between these portions.

Below the applying members is a pan or receptacle 329 for the adhesive, this being mounted upon a platform 330 carried by opposite links 332 joined to arms 334 projecting upwardly from a spindle 333 extending transversely of the frame. Projecting from the spindle, at the front or operator's side of the machine-frame, is a hand-lever 335. By turning this lever in one direction, as appears in Fig. 3, the platform 330 and the receptacle 329 are raised to operating position. By swinging the lever to the opposite extreme of its movement, the platform and pan are caused to fall, carrying the contents of the latter away from the associated applying elements. This prepares for the removal of the pan. Journaled above the pan is a shaft 336 rotated at a relatively slow speed from the shaft 320 by spur-gearing 337. Upon this shaft 336 are two supply-rolls 338, 338 dipping in the glue and vertically alined with the respective applying members 316, 316. Near each extremity of the shaft 336 is fulcrumed a lever 340, the levers being joined by links 342 to arms 344 projecting from a spindle 346 extending across the under side of the frame 60. A hand-crank 348, furnished by an extension of one of the arms 344, allows the links to be raised and lowered to oscillate the levers 340. Each of these levers 340 carries at its upper extremity an approximately horizontal casing 350, through which extends a spindle 352. The spindles have fixed at their forward extremities bearings 354, in which turns a shaft 356 supporting two intermediate feed-rolls 358, which transfer the glue from the supply-rolls 338 to the applying segments 316. A spur-gear 359 rotates the rolls 358 from one of the shafts 314 at the same peripheral speed as the applying surfaces of the segments 316. Both the shaft 356 and the supply-roll-shaft 336 may be arranged for ready removal, to be replaced by other shafts upon which the rolls are mounted to correspond in transverse relation to the particular adjustment of the segments 316 being employed at the time. When the crank 348 is thrown forward, the rolls 358 are in their feeding relation, being forced into active co-operation with both the supply-rolls and the segments by springs 360 surrounding the spindles 352. When the crank is turned oppositely, the rolls 358 are removed from contact with both the supply-rolls and segments, so no glue is fed to the latter. A nut 362, threaded upon the end of each spindle, limits the movement of the intermediate rolls by the springs 360 when said rolls are withdrawn from co-operation with the companion rolls. To adjust the rolls 358 with respect to the segments 316, there is threaded into each bearing 354 a screw 364, the head of which contacts with the bearing of the corresponding shaft 314 when the rolls are in operating relation. Alteration of the position of these screws varies the spaces between the rolls 358 and the segments, and therefore the quantity of glue delivered to the latter. To furnish a corresponding adjustment between these intermediate feeding rolls and the supply rolls 338 which will be accessible, each of the bearings 354 has movable through it a spindle 366 engaging at its outer end a bearing of the shaft 336. The inner extremity of each spindle 366 carries a circular yoke 368 surrounding the shaft 336, with some intermediate space, and contained loosely in annular recesses in the bearings 354. Against the opposite side of each yoke from the spindle bears a screw 370 threaded through the corresponding bearing. The yokes 368 being held in a definite relation by the contact of the spindle 366 with the bearings of the shaft 336, turning the screws 370 in or out respectively moves the rolls 358 from or permits them to approach the rolls 338. This causes the former rolls to receive less or more glue. The adjustment of the intermediate rolls relatively to both supply and applying rolls is made possible by the lateral play of the spindles 352 in the enclosed casings and by some such connection as an Oldham coupling 372 in the shaft 356.

Opposite each applying segment 316 is a pressure- or abutment-roll 374 upon a shaft 376 lying above the blank-supporting rails and preferably having a resilient contact-surface, as of rubber. The rolls 374 may be adjustably secured for variation longitudinally of their shaft to enable them to be placed in vertical alinement with the segments 316 whenever these are adjusted. The shaft 376 is shown as journaled in levers 378 at opposite sides of the frame, and the rolls are forced yieldably toward the applying segments by a spring 380 interposed between a depending arm of the lever and a projection from the frame. A screw 382, threaded through the frame-projection and furnishing an abutment for the spring, allows the resistance offered by said spring to the movement of the rolls 374 to be varied. Rotation is imparted to the pressure-roll-shaft through a gear 384 from one of the gears 323, so the applying segments and pressure-rolls turn at the same peripheral speed. The normal separation between the rolls and segments may be altered by screws 386 threaded into ends of the levers 378 and urged by the spring 380 against flattened portions 388 of a shaft 390 arranged to be turned in bearings in the frame by a crank 392. When the operator wishes to prevent the pressure-rolls form acting, the shaft 390 is so turned that its cylindrical portion bears against the screws 386, this acting as a cam to raise the bearings of the shaft 376 and separate the rolls from the segments.

In the operation of the gluing mechanism G, the blanks advanced by the lugs of the chains 238 over the rails 230 and 232 are presented to the segments 316 at such a time that the blanks are forced by the pressure-rolls 374 into contact with the surfaces of the segments coated with the adhesive. This adhesive is raised from the pan 328 by the supply-rolls 338, and distributed over the applying areas 324 and 326 of the segments by the intermediate rolls 358. One of the blanks having been thus glued, the space between successive blanks allows the segments to complete their revolution before the leading end of the next blank arrives in gluing position.

As long as the blanks are received regularly by the gluing mechanism G under the influence of the chain-lugs, the stencils of the applying segments will never contact with the surfaces of the pressure-rolls, because of the timing of the delivering and gluing elements. That is, when the stencil-surfaces are opposed to the pressure-roll, there will normally be a blank between them. During the periods between the arrival of successive blanks at the segments, said segments are angularly separated from the pressure-rolls, so no glue is applied to the latter. If, however, the correct sequence of blank-feed should be broken, the coated stencil-surface might come in contact with the pressure-rolls and thus cause them, in turn, to apply glue to the wrong side of the following blanks. This is prevented by the mechanism best illustrated in Figs. 7 and 15 of the drawings. Upon the shaft 376 is fixed a cam-disk 396. This has a flattened portion at 398, which corresponds to the active or gluing time of the segments, while the remainder of the cam-surface is of circular contour. Vertically alined with the cam is a roll 400 mounted to turn upon a lever 402 fulcrumed on the frame. This lever is held up, with its roll against the cam, by a spring 404. At the opposite extremity of the lever from the spring is pivoted upon the frame a latch member 406. This latch is mounted upon a transversely extending spindle 405, and has an adjustable contact member 407, which may engage the lever 402 to lock the roll 400 in a raised position. A feeler-arm 408 projects from the latch-spindle with a portion arranged to ride upon the blanks as they approach the bite of the segments 316 and rolls 374. In the normal operation of the mechanism as previously outlined, the roll 400 is successively pressed down by the cylindrical portion of the cam, being lifted by its spring when the flattened periphery 398 reaches it. The latch is at such times rendered ineffective, either by being withdrawn through contact of the feeler 408 with a blank, or because its contact-end 407 rides against the extremity of the lever. But when the correct timing of the blanks is for any reason destroyed and there is an abnormal space between successive blanks, the feeler-arm will be allowed to descend by gravity at a time when the roll is raised against the flat portion 398 of the cam. This allows the latch to move beneath the now raised end of the lever, locking it up with the roll 400 held against downward displacement. Therefore, as the cylindrical surface of the cam reaches the roll, it causes said cam to elevate the pressure-roll-shaft 376, so the peripheries of the rolls cannot contact with the stencil-surfaces. This continues until a blank correctly engaged by the chain-lugs reaches the feeler-arm. Then, on account of the timing between the mechanisms, the pressure will be removed from the roll 400 by the flattened periphery of the cam, and the latch is withdrawn as a result of the engagement of the blank with the feeler, restoring the mechanism to its normal condition.

During its further advance by the chains 238 from the gluing section G toward the setting-up section I, the blank comes under the influence of a drying device furnished by warm-air conduits 410, 410 (Fig. 17) situated at opposite sides of and beneath its path and having in their upper portions elongated slots 412, from which the air is discharged upon the glued surfaces of the end-wings and their extensions. This exerts a sufficient drying influence upon the glue to cause it to become properly tacky and in condition to adhere without the necessity for providing a considerable length of travel.

Near the ends of the rails 230, 232, the mechanism H acts to feed each blank into the setting-up section I. As illustrated in Figs. 5 and 19, a lever 420 extends up from its fulcrum upon the frame and is oscillated by entrance of a roll 421 upon it into a cam-groove in a disk 422 on the shaft 142. The upper extremity of the lever carries a pin 424 projecting oppositely and having turning upon each end a head 426, through which a rod 428 is adjustable to vary its effective length. Between the central blank-supporting rail 230 and each of the outer companion rails 232 is a guide-rail 432 for a feeding slide 434. Pivoted upon each slide is a feed-finger 436 provided with a forwardly projecting portion 438 normally held up into the plane in which the blanks are delivered by the chain by a relatively light spring 440 interposed between the finger and the slide. The movement of the fingers is timed with the travel of the chain-lugs 252, so that the former engage the rear edge of each blank somewhat before said lugs reach the sprocket-wheels 240, and then, traveling under the influence of the cam-disk 422 more rapidly than the lugs, carry the blanks away from these. The fingers deliver the blanks against stops 442, 442 at the forward side of section I in place for the setting-up operation, and then retreat to feed the succeeding blank. In this reverse travel, the fingers may be forced down and drag along the under side of this next blank, the yield of the springs 440 allowing such action. To prevent the blanks from leaving the feed-fingers 436 in their advance or from riding above them, I have shown as resting upon them, near their center lines, a retarding finger 444 (Fig. 17) pivoted upon a bracket 446 and drawn down upon the blanks by a spring 448 adjustable as to tension. The finger 444, which acts upon the blanks to a point beyond the maximum advance of the feed-fingers, also holds the blanks from rebounding from the stops 442. The pivotal mounting of the finger enables it to rise and fall with a vertically movable element 449 of section I. This member 449 is later described in detail.

Were some irregularity in the feeding of the blanks by the fingers 436 to interfere with their advance into the setting-up section, they would buckle under the pressure. This departure of the blanks from the normal plane is utilized to stop the apparatus if such choking occurs. Just to the rear of the setting-up section, above the blank-supporting rails and directly associated elements, is a transverse shaft 450 (Fig. 17) mounted for oscillation. Fixed upon this shaft and extending downwardly and forwardly into contact with or in close proximity to the upper surface of the blanks as they pass into the setting-up section under normal conditions, are two fingers 452. At one extremity, the shaft has fastened upon it a latch-arm 454, which engages and holds down a plunger 456 guided for reciprocation upon a bracket 458. A spring 460 acts to urge the plunger up when it is released by the latch, its upper end then striking a stop-button 462, which breaks the circuit of the motor 150. As long as the blanks are fed normally one by one into the setting-up section, the fingers 452 are not raised, and the stop-button remains unaffected. If, however, choking occurs and a blank is deflected upwardly, the resulting elevation of the fingers rotates the shaft 450, withdrawing the latch 452 from the plunger, which is thereupon raised by the spring 460, striking the stop-button and opening the motor-circuit so the operation of the machine ceases.

In the setting-up section I, the blank is received in a generally horizontal position upon the top of an expansible form consisting of a central portion 470 and end-portions 472, 472 movable toward and from the central body-portion. The arrangement of this form is best shown in Figs. 27 and 28. A slide 474, guided in ways 476 (Fig. 10) in the frame, has the form-body secured upon its upper extremity. The ends 472 are provided with extensions 478, 478 movable through the body, one of the extensions of each end being of sufficient length to reach beyond the center of the body, at which point it carries rack-teeth 480. The slide 474 is joined by a connecting-rod 482 to a bell-crank lever 484 operated through a roll 486 entering a cam-groove in a disk 488 rotatable by a shaft 490 journaled longitudinally at one side of the frame 60. The shaft 490 is driven through bevel-gearing 492 (Fig. 5) from the shaft 142. The form is thus raised and lowered for the purposes hereinafter described. Rotatable in the slide 474 is a vertical shaft 494 carrying, at its upper end, a pinion 496 meshing with both racks 480. The lower portion of the shaft 494 is squared, so it will be turned by, and yet capable of moving through, a pinion 498 held by the frame against vertical movement. Sliding horizontally in the frame and meshing with the pinion 498 is a rack 500 reciprocated by a bell-crank lever 502 provided with a roll 504 entering a cam-groove in a disk 506 fast upon a shaft 508 rotated by bevel-gearing 510 (Fig. 2) from the shaft 142. By these connections, the ends 472, 472 of the form may be simultaneously moved from points separated from the body 470 of the form (Figs. 23 and 24), at which they lie beneath the extreme outer portions of the body 30 of the blank and against the end-wings when these are folded down, to retracted positions (Figs. 25 and 26), in which the end-section are close to the form-body, and a space is left inside the end-wings of the blank for the introduction of folding instrumentalities. To enable the operator to vary the extent of movement of the ends 472 from the body of the form and thus the support furnished for the end-wings during the succeeding folding operation, the point of connection of the lever 502 to the rack 500 is made adjustable, as is particularly illustrated in Fig. 11 of the drawings. The lever has at its upper extremity a block 516 adjustable along a horizontal slot in said lever by screws 518, 518 threaded into the ends of the slot. A link 520 turns upon the end of the rack and has a pin 522 passing through an opening in the block.

Guided for vertical movement upon the form-slide 474 is a slide 528 carrying at each side of its upper extremity a yoke 530. To upturned ends of the yokes are secured blank-supporting shelves 449 and 533 lying at opposite sides of the form beneath the side-wings 32 of the supported blank. These members 449, 533 are first moved with the form, and then held stationary while travel of the form continues, to be later returned to their initial positions in the same horizontal plane as the blank-supporting surface of the form. This is accomplished by connections including a link 534, a lever 536 and a roll 538 lying within a cam-groove in a disk 539 upon the shaft 508. It will be noted that the inner shelf 449 furnishes a surface over which the blanks are introduced into the setting-up section by the fingers 436, and with which the blank-retarding finger 444 co-operates, while the outer shelf 533 has adjustably fixed upon it the stops 442.

The blanks enter the setting-up section beneath a side-wall 540 (Fig. 17), and leave it in an elevated position of the form, as completed covers, above an opposite side-wall 542. The term "side" is here used as defining the relation of the elements to the corresponding box-wall, rather than to the machine-frame. The wall 542 carries upon its upper surface, opposite edge-gages 544, 544, by which the covers are guided for discharge. Slot-and-screw connections 546 (Fig. 18) allow these gages to be adjusted for proper cooperation with the cover. From each end of each wall 540, 542 depends a projection 548 having a curved face 550 so situated as to engage the corner-laps 38 as a blank is raised upon the form, and to bend each down substantially at right angles to its side-wing (Fig. 22) which is at the time supported upon one of the shelves 449, 533. Near its lower portion, each of the walls 540, 542 is provided with a curved surface 552, with which a side-wing contacts during the continued elevation of the form following the folding of the corner-laps. At this time the shelves are stationary. The side-wings are thus turned down at right angles to the body-portion 30 of the blank, the corner-laps extending over the ends 472 of the form. In a later pressure-applying operation upon the set-up cover, the walls 540, 542 are simultaneously moved in toward the form to retain the side-wings against deformation by bulging outwardly. The walls are guided in ways 554 (Figs. 17 and 18) and have attached at their ends pairs of horizontal racks 556, 556. With each pair of racks mesh pairs of pinions 558, 558 fast upon a shaft 560 journaled horizontally in the frame, and to one extremity of each shaft is secured a gear-segment 562. The teeth of this segment are engaged by a vertical rack 564 yieldably actuated by a rod 566, which has telescoping sections separated by a spring 568. Each of the rods 566 is articulated to a bell-crank lever 570 (Fig. 10) having a roll 572 operating in a cam-groove. This groove for the wall 540 is in a disk 574 on the shaft 490, while that for the wall 542 is in the disk 506 upon the shaft 508.

At or about the same time that the side-wings are folded by the wall-surfaces 552, the end-wings engage similar curved surfaces 580 upon the hooked ends 582 of horizontally extending folding and pressure-abutment levers 584 (Fig. 10). The end-wings are thereby turned down outside the corner-laps (Fig. 23). The elevation of the form continues until the lower faces of the end-sections 472 are just above the upper ends of the hooks 582. Each lever 584 is fulcrumed upon the divided upper extremity 585, 585 of a carrier and actuating lever 586, which is, in turn, fulcrumed upon the frame. To the folding levers is imparted a compound movement having horizontal and vertical components. The former is provided by oscillation of the two folding levers by rolls 587 mounted upon the actuating levers 586 and lying in cam-grooves in disks 588 and 590 upon the shafts 490 and 508, respectively. Each roll 587 may be variably positioned upon its lever 586, to alter the normal relation of the corresponding folding lever, by adjusting a slide 589 which carries it on the lever 586. The adjustment is effected by a screw 591 and fixed by a screw 593. To oscillate the levers 584 vertically, the outer extremity of each is joined by a rod 592 to a lever 594, a roll 596 of which enters a cam-groove, that of one lever being in the disk 574 and that of the other in the disk 506. The resultant movement of the levers 584 carries a vertical surface 598 of each hook 582 against the vertically positioned end-wing-extension 40 (Fig. 24), folding it in, while the end-wing is retained against inward displacement by the expanded end-section 472 of the form. When the end-wing-extensions have reached approximately horizontal positions, the sections 472 are retracted by the racks 480 and other connections to the cam-disk 506. The elements are then as appears in Fig. 25. In the continued movement of the hooks 582, their upper ends are raised between the drawn-in ends of the form and the adjacent end-wings, as is shown in Fig. 26, each hook turning the corresponding end-wing-extension up parallel to the end-wing and folded-in corner-laps. Finally, each hook is moved out slightly against the extension in preparation for the application of pressure to the outside of the end-wing, a surface 600 lying within the point of the hook 582 transversely of the lever 584 furnishing an abutment to resist this pressure. The curve described by the point of the hook is indicated by a dotted line $x$ in Fig. 10. The action upon the end-wing-extensions is such that they are not in danger of being broken by abrupt changes in direction of the hooks, yet the path followed is relatively short and economical of time. The surface 600 is shown as provided with a projection 602 so disposed as to lie opposite the space between the adjacent ends of the corner-laps. The extension of the projection 602 beyond the surface 600 is sufficient to equalize the pressure over the entire end-wing. During the turning-up travel of the hooks, there is a possibility that the end-wings, now without the support of the form-ends, might be displaced, turning about the creases 36 and buckling inwardly. This I render impossible by spaced retaining fingers 604 (Fig. 27) projecting from the body 470 of the form and received by slots 606 in the under sides of the ends 472, and also by registering slots 608 (Fig. 23) in the surfaces 598 of the hooks. When the end-sections are retracted, the fingers have sufficient outward extension from the form to hold the end-wings against inward movement beyond the capacity of their resilience to restore them, so the elevation of the hooks against the end-wing-extensions will not cause collapse of the end-formations.

Pressure is now to be applied to the end-wings to cause their adhesion, by virtue of the glued surfaces, to the end-wing-extensions and corner-laps. Referring particularly to Figs. 9, 10 and 26, there is guided at each side of the setting-up section I, and therefore at each end of the form 470, 472, a pressure-head 612. Each head includes a slide 614 arranged to reciprocate in horizontal ways in the frame 60 and having mounted upon its upper surface a contact member 616, which is thus moved into engagement with the end-formation of the box in a direction substantially at right-angles thereto. This member is adjustable on the slide toward and from the form by slot-and-screw connections 618, and by a horizontal screw 620 threaded into the slide and against which the outer end of the member abuts. The portion of the slide receiving the abutment-screw may be divided, and the latter clamped in place by a screw 622. As shown in Fig. 10, I prefer to incline the pressure-surface 624 of each member 616, it diverging downwardly and outwardly from the corresponding abutment-surfaces 600 and 602 on the hooks 582. This causes the maximum pressure to be applied along the inner portion of each end-formation of the cover, and prevents deforming and possibly weakening the doubled-over outer edge at the crease 42. It may also be caused to compensate for the spring of the members as they apply the pressure. Pivoted to the outside of each slide 614, between the divided portions of the corresponding lever 586, is a short horizontally extending rod 626 having movable upon its outer extremity a cup 628 held against outward displacement by a nut 630. Encircling the rod is a helical spring 632 abutting against the cup and against a flange upon an inner sleeve 634 threaded upon the rod. Trunnions 636 (Fig. 9) project from the cup and are pivotally connected to the upper spaced arms of a substantially vertical lever 638 fulcrumed upon the frame. These connections from each lever 638 to its slide 614 extend between the divided portions 585, 585 of the carrier-lever for the folding member 584. A roll 640 upon one of these levers co-operates with a cam-groove in the disk 588 to effect the reciprocation of the slide 614, while the other lever is similarly actuated by the cam-disk 590. As these forces are transmitted through the springs 632, the pressure is yielding. The force may be altered by changing the compression of either spring by adjustment of its sleeve 634.

Above the form, and the blank or cover thereon, is an abutment-plate 650 carried by a rod 652 depending from a top-girt 654 reciprocated vertically by two side-rods 656, 656 situated at diagonally opposite corners of the form and movable through guides 658 carried by the frame. Each side-rod is connected by a link 660 to a bell-crank lever 662 fulcrumed below the form. Upon each of these levers is a roll 664, the roll of one lever lying within a cam-groove in the disk 488, and that of the other lever in a groove in the disk 539. These cams cause the plate to be actuated in the following manner: During the introduction of the blank by the fingers 436, the plate is so spaced from the form as to permit this delivery, yet the space between these members is kept sufficiently narrow to hold the blanks against curvature or bulging which might cause their displacement when they strike the stops 442. After this, it may be lowered to clamp the blank upon the form. In the elevation of the form, the plate rises with it with the blank held between them during the folding operations and until pressure is applied by the members 616. At this time, the folded cover is released to permit it to center itself. The dimensions of the abutment plate 650 are such that its edges lie at the inner sides of the creases 36 which separate the peripheral margins or wings of the blank from the body-portion 30, and also within the inner faces of the walls 540 and 542 and the members 616. But before the completion of the pressure-movement, the form and the plate descend slightly with the cover held between them, this terminating simultaneously with the final movement of the pressure members. When this occurs, the cover is retained against downward movement at the lower edges of its side-walls by shoulders 666 (Fig. 17) on the walls 540, 542. The end-walls of the cover are held fixed by the members 616. The pressure of the plate carries the top of the cover down somewhat toward the wall-edges by compression of the material, and in so doing forces the laminæ at the inside of the creases 36 between the body-portion 30 and the side- and end-wings 32 and 34, respectively, into cutaway or beveled portions 668 at the sides of the form (Figs. 26 and 28) and into the spaces between the members 616 and the plate at the ends of the form (Fig. 29). By this action, all the walls preferably being held against flexure, the creases are upset, the laminæ of the shell-material contained in the inwardly protruding portions of the creases being further bent inwardly and separated from one another at the point 46, as shown in Fig. 21 for the unfolded blank, and becoming as appears at 52 in Fig. 29. The material is thus relieved from strain, so when the cover is delivered from the form, the tendency of the wings now constituting its side- and end-walls is to remain at right angles to the top or body-portion and not to full or bulge. The relation of the adjacent sides of the walls 540, 542, hooks 582 and pressure-members 616 to one another at the corners of the cover may be such that spaces are left between them, and there imparted to these elements an inward movement similar to that of the form and pressure-plate. This gives an upsetting of the laminæ of the creases at said corners, of the same character as that just described. The cover-walls are, at the same time, subjected to a uniform overbending action along their entire lengths.

The plate 650 is preferably yieldably mounted, and if more than one blank gets between it and the form, this yield saves the elements of the machine from damage during the upsetting pressure. The resulting upward movement of the plate may also be utilized to stop the apparatus and give the operator an opportunity to remove the doubled blanks. For this purpose, the rod 652 is movable on the top-girt 654 and connected as is most clearly shown in Figs. 2, 10 and 16 of the drawings. From the upper extremity of the rod 652 projects an arm 670, divided at its outer end to embrace an upright 672 clamped in the top-girt. This engagement holds the rod against rotation, and the plate in its proper angular relation with respect to the form. Secured to the arm is a horizontally extending pin 674 normally lying within a slot in a bell-crank lever 676 fulcrumed upon the top-girt. Pivoted to an upwardly extending arm of the bell-crank lever is a toggle, consisting of a short link 678 and a yieldable link having a section 680 joined to the link 678 and a second section 682 articulated to the top-girt at 684. The section 682 has a reduced portion 686 guided in its companion, and between this section and a sleeve 688, adjustable by threaded engagement at 690 with the section 680, is interposed a spring 692. Nuts 694 limit the movement of the link-section 680 by the spring, while a nut 696 locks the sleeve in different adjustments to provide for variation in the expansive force of said spring. The link 678 has an extension 698, which reaches to the end of the section 682 and there carries a hook 700 variable in position upon it and arranged to engage a latch 702 pivoted upon the section 682. A spring 704 holds the hook and latch in normal engagement. The link 678 and the compound link 680, 682 together furnish a toggle, the normal relation between the parts of which is such that the breaking of the toggle is just started in an upward direction, as viewed in Fig. 16 of the drawings, separation being prevented by the latch 702. As long as the elevation of the top-plate and the consequent compression of the spring 692, as a result of the rocking of the lever 676, does not exceed a certain amount, the toggle remains in the relation illustrated. By this means, the body-portion of a blank is normally clamped yieldably between the form and plate for the operations upon it. When, however, some such abnormal condition as the presence of more than one cover between the plate and the form causes an excessive compression of the spring, the hook 700 will be carried beyond the latch 702, and the toggle is freed and breaks completely, releasing the spring and allowing the top-plate to rise freely to relieve the work of pressure. To reset the connections after the doubled blanks have been removed, it is only necessary to bring down the link-extension 698 until its hook is again retained by the latch, the yield of the spring 704 allowing this. If the operator wishes at any time to gain access to the form, this may readily be brought about by drawing back the latch through a finger-piece 706. This similarly leads to the full breaking of the toggle from its normal somewhat deflected relation.

To provide for the stopping of the machine when this release of the top-plate occurs as a result of its assumption of an abnormal position under the influence of plural blanks, there is guided at 710, to move vertically upon the top-girt 654, a slide 712 (Fig. 16), which has a horizontal portion overhanging the arm 670 and provided with a contact-screw 714 threaded vertically through it. The slide has at its lower extremity a pivoted portion 716, which is held alined with the body of said slide by pressure against its right-hand edge. Mounted for reciprocation in the top-girt is a horizontal rod 718 having a collar or enlargement 720 forced by a spring 722 against the slide portion 716. The spring acts against an abutment member 723 fixed to the top-girt, and at the opposite side of said abutment member are nuts 724 threaded upon the end of the rod and limiting its movement under the influence of the spring. The opposite or left-hand end of the rod is arranged, in the normal operation of the apparatus, to pass just to one side of an arm 726 pivoted on the frame and lying against a switch-button 728 governing the circuit of the motor 150. When the top of the plate-rod 652 is sufficiently raised to break the yieldable connections, as just described, the arm 670 strikes the contact-screw 714, lifting the end 716 of the latching slide 712 out of the path of the enlargement on the rod 718. The spring 722 thereupon forces said rod to the left until it is opposite the switch-arm 726. This arm, at the side toward the rod, has a cam-edge, which is struck by said rod in the final descent of the top-girt when the plate 650 is being released. This causes the depression of the button 728 to cut off current from the motor and stop the entire apparatus.

Upon completion of the pressure on the end-formations of the cover, the pressure-heads 612, 612 and the side-walls 540, 542 are retracted, and the hooks 582 withdrawn from the interior of the cover, all being restored to their initial positions. The form 470, with the ends 472 still drawn in and the cover resting upon it, is raised until the edges of the end-walls are just above horizontal shoulders 740 (Fig. 10), which are formed upon the pressure members 616 at a level somewhat higher than the upper surface of the side-wall 542. The plate 650 is also lifted, spaced from the form, so it fully frees the cover for removal. After the elevation of the cover, the members 616 move in so the shoulders 740 are beneath its end-walls. Then, the form having descended to its normal position and the ends expanding as the final step in its cycle, the completed cover is left supported upon the shoulders. It is removed from the setting-up section I by the means J, illustrated in Figs. 2, 5 and 9 of the drawings. Extending longitudinally of the machine, upon each of the pressure-heads 612, is a guide-rail 742, upon which a slide 744 is movable. A connecting-rod 746 unites each slide to an arm 748 secured to a shaft 749 journaled upon the frame above the setting-up section. This shaft also has fast upon one extremity an arm 750 joined by a connecting-rod 752 to a bell-crank lever 754. A roll 756 upon this lever enters a groove in the cam-disk 422. The cover being positioned as just described and the falling form having cleared it, the slides 744 are advanced from normal positions above the wall 540, so that lateral inner projections 758 strike corners of the cover at the junctures of the rear side-wall and the end-walls and push said cover over the shoulders 740 across the top of the wall 542 between the guides 544, so it is ejected into a forwardly and downwardly curved chute 760 made up of spaced side-sections. The cover having been thus removed from the setting-up section, the plate 650 is lowered to its initial position above the previously depressed form. The chute deposits the cover in a trough 762 extending across the delivery-end of the machine and formed between an inner wall 764 and a lower outer wall 766. Along the upper surface of the last-mentioned wall operates a chain 768 of the conveyor K engaging a sprocket-wheel 770 surrounding a short shaft 772 journaled longitudinally of the frame and also passing over a sprocket-wheel at the point of delivery of the covers, the latter wheel not being shown. The shaft 772 is driven by spur-gearing 774 from the cam-shaft 508. Projecting horizontally from the chain, above the trough, is a series of contact-fingers 776, their travel being so timed with respect to the operation of the setting-up section that each cover delivered is engaged by a finger and carried along the trough to the desired point, where, for example, said covers may be stacked.

To avoid difficulties caused by the covers clogging in the trough 762 and to promptly inform the operator of the trouble, the sprocket-wheel 770 is releasably joined to the shaft 772, so, when abnormal resistance is opposed to the advance of the covers, the driving force is disconnected and the machine stopped. Referring to Figs. 8 and 9, the outer face of the sprocket-wheel is a hub 780 having a peripheral V-shaped depression 782. Fixed upon the end of the shaft 772 outside the hub 780 is an arm 784, upon which is fulcrumed a lever 786 provided with a roll 788 drawn toward the edge of the hub by a spring 790. Under normal conditions, the roll occupies the depression and transmits the rotation of the shaft 772 to the sprocket-wheel and therefore to the conveyor-chain 768 to advance the covers. When thus operating, the outer edge of the lever 786 passes freely beneath a lever 792 fulcrumed upon a bracket above it and held yieldably down by a spring 794. If such resistance is offered to the travel of the conveyor as would result from clogging of the covers in the trough, the roll 788 is forced up one of the inclined walls of depression 782 and rides upon the periphery of the hub. The operation of the conveyor therefore ceases. The lever 786, in the present position of the roll, is sufficiently far from its axis of revolution to strike the lever 792, lifting the outer end thereof and depressing the inner. At the latter point, there is engaged a stop-button 796 governing the circuit of the primary driving motor 150 and opening said circuit. The machine therefore comes to rest.

Having described my invention, what I claim as new and desire to secure by Letters Patent of the United States is:

1. In a box-making machine, mechanism for operating upon box-blanks, a holder for blanks to be formed, blank-supporting rails situated between the holder and forming mechanism, a yieldable pressure-bar co-operating with the rails and having constant engagement with the blanks thereon, and means including blank-engaging projections for advancing the blanks between the rails and bar.

2. In a box-making machine, forming mechanism, a holder for blanks to be formed, blank-supporting rails situated between the holder and forming mechanism, mountings for the rails arranged to permit their transverse adjustment, a retaining bar co-operating with the rails and having constant engagement with the blanks thereon, a mounting upon which the bar is yieldable, said mounting being arranged to permit the transverse adjustment of the bar, and means including blank-engaging projections for advancing the blanks between the rails and bar.

3. In a box-making machine, forming mechanism, a holder for blanks to be formed, blank-supporting rails extending between the holder and forming mechanism, a carrier-bar situated above each rail, a pressure-bar movable upon each carrier-bar and co-operating with the corresponding rail, at least one of said pressure-bars having constant engagement with the blanks on the rails, and a blank-conveyor operating longitudinally of the rails and provided with blank-engaging projections.

4. In a box-making machine, forming mechanism, a holder for blanks to be formed, blank-supporting rails extending between the holder and forming mechanism, a carrier-bar situated above each rail, a pressure-bar movable upon each carrier-bar and co-operating with the corresponding rail, at least one of said pressure-bars having constant engagement with the blanks on the rails, springs interposed between the carrier-bars and pressure-bars, and a blank-conveyor operating longitudinally of the rails and provided with blank-engaging projections.

5. In a box-making machine, forming mechanism, a holder for blanks to be formed, blank-supporting rails extending between the holder and forming mechanism, bars extending across the rails, carrier-bars variable in position upon these cross-bars, pressure-bars movable upon the carrier-bars and co-operating with the rails, at least one of said pressure-bars having constant engagement with the blanks on the rails, springs interposed between the carrier-bars and pressure-bars, and a blank-conveyor operating longitudinally of the rails and provided with blank-engaging projections.

6. In a box-making machine, forming mechanism, a holder for blanks to be formed, blank-supporting rails extending between the holder and forming mechanism, bars extending across the rails, carrier-bars variable in position upon these cross-bars, pressure-bars yieldable upon the carrier-bars and co-operating with the rails, at least one of said pressure-bars having constant engagement with the blanks on the rails, springs interposed between the carrier-bars and pressure-bars, edge-gages situated outside the rails, slot-and-screw connections for adjustably positioning the edge-gages, and a blank-conveyor operating longitudinally of the rails and provided with blank-engaging projections.

7. In a box-making machine, a blank-holder, means for operating upon the blanks, a conveyor traveling between the holder and operating means and delivering to the latter, and means controlled by the position of the blanks under the influence of the conveyor for stopping said conveyor.

8. In a box-making machine, a blank-holder, means for operating upon the blanks, means for normally advancing blanks from the holder to the operating means in a uniformly positioned series, a movable controlling member, means for holding the normally advancing blanks out of active engagement with the controlling member, displaced blanks contacting with and moving said member, and connections to the controlling member for governing the operation of the machine.

9. In a box-making machine, a blank-holder, means for operating upon the blanks, a conveyor for normally advancing blanks from the holder to the operating means in a uniformly positioned series, a movable controlling member, means for holding the blanks normally advanced out of active engagement with the controlling member, displaced blanks contacting with and moving said member, and connections to the controlling member for governing the conveyor.

10. In a box-making machine, a blank holder, means for operating upon the blanks, means for advancing blanks from the holder to the operating means, a member provided with a depression arranged to receive each advancing blank, a controlling member arranged for contact with the blanks adjacent to the depression, and connections to the controlling member for governing the advancing means.

11. In a box-making machine, a blank-holder, means for operating upon the blanks, means for advancing blanks from the holder to the operating means, a member provided with a depression arranged to receive each advancing blank, said depression being of a size to receive a single blank only, a controlling member arranged for contact with the blanks adjacent to the depression, and connections to the controlling member for governing the operation of the machine.

12. In a box-making machine, a blank-holder, means for operating upon the blanks, a conveyor traveling between the holder and operating means and delivering to the latter, said conveyor having blank-engaging projections, and means operable in timed relation to the projections and co-operating with the blanks to stop the conveyor.

13. In a box-making machine, a blank-holder, means for operating upon the blanks, a conveyor traveling between the holder and operating means and delivering to the latter, a bed-roll situated below the conveyor and having a depression, a feeler arranged for engagement with the blanks above the depression, and connections to the feeler for governing the conveyor.

14. In a box-making machine, a blank-holder, means for operating upon the blanks, a conveyor traveling between the holder and operating means and delivering to the latter, a bed-roll situated below the conveyor and having a depression of a size to receive a single blank only, a feeler arranged for movement by the blanks lying upon the bed-roll outside the depression, a stop device, and connections to the feeler to actuate the stop device.

15. In a box-making machine, a blank-holder, means for operating upon the blanks, means for advancing blanks from the holder to the operating means, electrical power means for operating the machine, a circuit-controlling device for the power means provided with a contact element, a lever arranged for contact with said element, and a latch for the lever movable under the influence of the blanks.

16. In a box-making machine, a blank-holder, means for operating upon the blanks, a conveyor traveling between the holder and operating means and delivering to the latter, an electrical motor for operating the conveyor, a circuit-controlling device for the motor, an actuating member for said device, and a feeler arranged for engagement with the advancing blanks and having latching means for the actuating member.

17. In a box-making machine, a blank-holder, means for operating upon the blanks, a conveyor traveling between the holder and operating means and delivering to the latter, an electrical motor for operating the conveyor, a circuit-controlling device for the motor, an actuating member for said device, a bed-roll situated below the conveyor and having a depression, and a lever provided with a feeler-portion arranged for contact with the blanks over the depression and with a latching portion for normally retaining the actuating member against movement.

18. In a box-making machine, mechanism arranged to fold blanks along creases, means for advancing blanks to the folding mechanism, and adhesive-applying mechanism through which the blanks are advanced, said applying mechanism comprising a stencil member provided with raised adhesive-applying areas and an intermediate depression for registration with a crease of each blank operated upon.

19. In a box-making machine, mechanism arranged to fold blanks including end-wings and their extensions and corner-laps defined by creases, means for advancing the blanks to the folding mechanism, and adhesive-applying mechanism through which the blanks are advanced, said applying mechanism comprising a stencil member provided with raised adhesive-applying areas for registration with portions of each end-wing which are to contact with the corner-laps in the set-up box and with the entire end-wing-extension and with a depression between the end-wing and end-wing-extension areas, said depression receiving the creases and freeing them from pressure.

20. The combination with an adhesive-applying member, of an adhesive-receptacle, a supply-roll rotatable in the receptacle, an adhesive-transferring roll normally operating in adhesive-receiving and -delivering relation to the supply-roll and applying member, a lever upon which the transferring roll is journaled, and a crank connected to move the lever, said lever having positions in which the transferring roll is respectively active and inactive with reference to both the applying member and supply-roll.

21. The combination with an adhesive-applying member, of an adhesive-receptacle, a supply-roll rotatable in the receptacle, a lever fulcrumed adjacent to the receptacle, a spring rendering the bearing yieldable upon the lever, an adhesive-transferring roll journaled in the bearing and movable by the spring into simultaneous receiving and delivering relation to the supply-roll and applying member, and connections to the lever for moving the transferring roll into and out of active position.

22. The combination with an adhesive-applying member, of an adhesive-receptacle, a lever fulcrumed adjacent to the receptacle, a bearing movable upon the lever, an adhesive-transferring roll journaled in the bearing, a spring associated with the lever and arranged to force the roll toward its active position in simultaneous receiving and delivering relation to the supply-roll and applying member, there being means carried by the lever and bearing to limit the movement of the roll, and connections to the lever for moving the transferring roll into and out of its active position.

23. The combination with an adhesive-applying member, of an adhesive-receptacle, a lever fulcrumed adjacent to the receptacle, a spindle movable through the lever, a bearing mounted upon the spindle, a transferring roll journaled in the bearing, a spring interposed between the lever and spindle, a crank, and a link joining the crank and lever.

24. The combination with an adhesive-applying member, of an adhesive-receptacle, a supply-roll operable therein, a feed-roll co-operating with both the supply-roll and applying member, a movable support for the feed-roll, and means independent of each other and arranged to vary the relation of said feed-roll to both the supply-roll and applying member.

25. The combination with an adhesive-applying member, of an adhesive-receptacle, a supply-roll operable therein, a feed-roll co-operating with both the supply-roll and applying member, a movable support for the feed-roll, yieldable means for forcing the feed-roll toward the supply-roll and applying member, and means independent of each other and arranged to vary the extent of movement of the feed-roll toward both the supply-roll and applying member.

26. The combination with an adhesive-applying member, of an adhesive-receptacle, a supply-roll operable therein, a feed-roll co-operating with both the supply-roll and applying member, a screw arranged to control the relation of the feed-roll to the supply-roll, and a screw arranged to control the relation of the feed-roll to the applying member.

27. The combination with co-operating adhesive-transferring rolls, of a bearing for one of the rolls, a movable support for the bearing, a member movable upon the support and contacting with a point fixed relatively thereto, and an adjusting member movable upon the support and engaging the contact member.

28. The combination with co-operating adhesive-transferring rolls, of a bearing for one of the rolls, a movable support for the bearing, a member movable upon the support and contacting with a point fixed relatively thereto, an adjusting member movable upon the support and engaging the contact member, and an adjusting member movable upon the support for engagement with a relatively fixed point.

29. The combination with co-operating adhesive-transferring rolls, of a bearing for one of the rolls, a movable support for the bearing, said support having portions one of which is yieldable upon the other, a member movable upon the yieldable portion of the support and contacting with a point fixed relatively thereto, and an adjusting member movable upon the support and engaging the contact member.

30. The combination with an adhesive-applying member, of an adhesive-receptacle, a supply-roll operable therein, a feed-roll co-operating with both the supply-roll and applying member, a yieldable casing, a bearing for the feed-roll mounted upon the casing, a screw threaded into the casing and contacting with a relatively fixed point at the applying member, a yoke surrounding the feed-roll-bearing and provided with a spindle contacting with a relatively fixed point at the supply-roll, and a screw threaded through the casing and contacting with the yoke.

31. The combination with an adhesive-applying member, of an adhesive-receptacle, a supply-roll operable therein, a feed-roll co-operating with both the supply-roll and applying member, a lever, connections to the lever for moving it, a casing yieldable upon the lever, a bearing for the feed-roll mounted upon the casing, a screw threaded into the casing and contacting with a relatively fixed point at the applying member, a yoke surrounding the feed-roll-bearing and provided with a spindle contacting with a relatively fixed point at the supply-roll, and a screw threaded through the casing and contacting with the yoke.

32. The combination with a rotatable adhesive-applying member and a co-operating rotatable pressure member, of a lever in which one of the members is journaled, a screw threaded into the lever, and a shaft rotatable adjacent to the lever and having a cam-portion contacting with the screw.

33. The combination with a rotatable adhesive-applying member, of a rotatable pressure-roll co-operating with the applying member, a lever in which the roll is journaled, a screw threaded through the lever, and a rotatable shaft provided with a crank and with a flattened portion with which the screw may contact.

34. In a box-making machine, a blank-holder, blank-forming mechanism, means for advancing a blank from the holder to the forming mechanism, co-operating coating and pressure members between which the blanks are advanced, and means constructed and arranged to separate the members in absence of a blank between them and to maintain such separation with the members held against movement toward each other through successive cycles of operation until a blank is received.

35. The combination with opposite members arranged for contact with the work and relatively movable into and out of operating relation, of means for latching a member out of operating relation and there retaining it through successive cycles of operation, and means controlled by the work while the members are in operating relation for actuating the latching means.

36. The combination with opposite rotatable members arranged for contact with the work and relatively movable into and out of operating relation, of means for latching a member out of operating relation, means controlled by the work for actuating the latching means, and means rotatable with one of the members for effecting separation of their axes of rotation.

37. The combination with a rotatable coating-applying member, of a rotatable pressure member co-operating with and movable toward and from the applying member, a feeler movable by contact with the work, a latch mounted to move with the feeler, and a movable member mounted separately from the pressure member and arranged to move said pressure member, said movable member being retained by the latch.

38. The combination with a rotatable coating-applying member, of a rotatable pressure member co-operating with and movable toward and from the applying member, a feeler movable by contact with the work, a latch mounted to move with the feeler, a lever associated with the pressure member and arranged for retention by the latch, and a cam rotatable with the pressure member and contacting with the lever.

39. In a box-making machine, a blank-holder, blank-forming mechanism, a conveyor delivering blanks to the forming mechanism, a glue-applying member rotatable below the conveyor, a pressure-roll rotatable above the conveyor, bearings arranged to move the pressure-roll toward and from the applying member, a spindle mounted adjacent to the pressure-roll, a feeler carried by the spindle for contact with the blanks approaching the applying member, a latch fixed to the spindle, and a lever cooperating with the pressure-roll and arranged for retention by the latch.

40. In a box-making machine, a blank-holder, blank-forming mechanism, a conveyor delivering blanks to the forming mechanism, a glue-applying member rotatable below the conveyor, a pressure-roll rotatable above the conveyor, bearings arranged to move the pressure-roll toward and from the applying member, a spindle mounted adjacent to the pressure-roll, a feeler carried by the spindle for contact with the blanks approaching the applying member, a latch fixed to the spindle, a cam rotatable with the pressure-roll, and a lever contacting with the cam and arranged for retention by the latch.

41. In a box-making machine, a blank-holder, blank-forming mechanism, a conveyor delivering blanks to the forming mechanism, a glue-applying segment rotatable below the conveyor, a pressure-roll rotatable above the conveyor, bearings arranged to move the pressure-roll toward and from the applying segment, a spindle mounted adjacent to the pressure-roll, a feeler carried by the spindle for contact with the blanks approaching the applying segment, a latch fixed to the spindle, a cam rotatable with the pressure-roll and having a portion of reduced diameter corresponding in extension to the active portion of the segment, and a lever having a roll contacting with the cam and being arranged for retention by the latch.

42. In a box-making machine, adhesive-applying mechanism, blank-forming mechanism, a conveyor for advancing blanks from the applying mechanism to the forming mechanism, and a conduit extending along the conveyor and arranged to discharge air upon the coated surface.

43. In a machine for making boxes from blanks having opposite end-wings and end-wing-extensions, mechanism having means for applying adhesive to the end-wings and their extensions, mechanism for folding and pressing the coated surfaces, a conveyor for advancing the blanks with the end-wings and their extensions at each side thereof, and a conduit extending longitudinally of the conveyor at each side and provided with an elongated slot for discharging warm air upon the coated surfaces.

44. In a box-making machine, blank-forming mechanism, a conveyor delivering blanks to the forming mechanism, spaced guides extending toward the forming mechanism, slides movable upon the guides, yieldable blank-engaging fingers carried by the slides, a lever arranged to oscillate toward and from the forming mechanism, a member extending oppositely from the lever, and connections from the opposite ends of the member to the slides.

45. In a box-making machine, blank-forming mechanism, a conveyor delivering blanks to the forming mechanism, spaced guides extending toward the forming mechanism, slides movable upon the guides, yieldable blank-engaging fingers carried by the slides, a lever arranged to oscillate toward and from the forming mechanism, a member extending oppositely from the lever, connections from the opposite ends of the member to the slides, and means arranged to vary the effective length of the connections.

46. In a box-making machine, blank-forming mechanism, a conveyor delivering blanks to the forming mechanism, spaced guides extending toward the forming mechanism, slides movable upon the guides, yieldable blank-engaging fingers carried by the slides, a lever arranged to oscillate toward and from the forming mechanism, a pin extending oppositely through the lever, a head turning about each end of the pin, and a rod joining each head to the corresponding slide.

47. In a box-making machine, blank-forming mechanism including a movable member, means for delivering blanks to the forming mechanism, a pivoted finger contacting with the blanks over the movable member, and a spring acting to draw the finger toward said member.

48. In a box-making machine, an upwardly movable form, a blank-support associated with the form and movable in the same direction thereas, means for delivering blanks above the form and support, and a yieldable blank-retarding finger contacting with the blanks over the support.

49. In a box-making machine, blank-setting-up mechanism, means for advancing blanks successively to the setting-up mechanism, means adjacent to the setting-up mechanism for testing the blanks under the influence of the advancing means at that point, and means governed by the testing means for controlling the advancing means.

50. In a box-making machine, blank-setting-up mechanism provided with a stop, means for advancing blanks successively into setting-up position against the stop, means situated above the path of the blanks being advanced for testing the blanks beneath it, and means governed by the testing means for stopping the machine.

51. In a box-making machine, blank-setting-up mechanism, a reciprocatory finger delivering blanks to the setting-up mechanism, means movable by the blanks for testing said blanks during their delivery by the finger, and means governed by the testing means for stopping the reciprocation of the finger.

52. The combination with movable work-advancing means, of operating means for the advancing means, a feeler contacting with the work while it is under the influence of the advancing means, a latch movable by the feeler, and controlling means for the operating means normally maintained ineffective by the latch.

53. The combination with movable work-advancing means, of a feeler contacting with the work while it is under the influence of the advancing means, a latch movable by the feeler, electrical power means for the advancing means, and a circuit-controlling device for the power means governed by the latch.

54. In a box-making machine, blank-setting-up mechanism, means for advancing blanks to the setting-up mechanism, a shaft rotatable adjacent to the setting-up mechanism, a blank-feeler and a latch carried by the shaft, an electrical motor for operating the machine, a switch for controlling the motor, and an actuating member for the switch normally retained inactive by the latch.

55. In a box-making machine, a frame provided with opposite guideways, a box-supporting form having a body-portion and an end-portion movable toward and from the body-portion, a slide arranged to reciprocate in the guideways and furnishing a support for the body-portion, a shaft journaled in the slide, a pinion rotatable by the shaft and movable with the slide, a rack connected to the end-portion of the form and meshing with the pinion, a pinion arranged to rotate the shaft but retained by the frame against movement axially of the shaft, and a rack reciprocating upon the frame and meshing with the last-mentioned pinion.

56. In a box-making machine, a form having a body-portion and an end-portion movable toward and from the body-portion, there being a blank-retaining projection from one portion into the space between it and the associated portion.

57. In a box-making machine, a form having a body-portion and an end-portion movable toward and from the body-portion, and fingers fixed to the body-portion and extending into the space between it and the end-portion.

58. In a box-making machine, a form having a body-portion and an end-portion movable toward and from the body-portion, and fingers fixed to the body-portion and extending into the space between it and the end-portion, there being slots in the end-portion to receive the fingers.

59. In a box-making machine, a movable form over which box-blanks may be folded, a blank-support co-operating with the form to hold a blank-portion against displacement during the folding operation and movable independently of the form, said support having a surface over which the blanks are delivered upon a surface of the form, and means for moving the support in the direction of folding movement of the form.

60. In a box-making machine, a movable form over which box-blanks may be folded, blank-supports located at opposite sides of the form and movable together independently of said form, the support at one side having a surface over which the blanks are delivered upon a surface of the form, and a stop for the blanks carried by the other support.

61. In a box-making machine, a movable form over which box-blanks may be folded, a movable blank-support co-operating with the form, means for moving the form, and means for moving the support with the form and for thereafter maintaining said support stationary while movement of the form continues.

62. In a box-making machine, a movable form over which box-blanks having side-wings and corner-laps may be folded, a member situated below the side-wing at each side of the form in its initial position, such members and the form being movable independently, and means for folding the corner-laps while the side-wings are supported by the members.

63. In a box-making machine, a vertically reciprocatory form, a blank-supporting shelf situated at each side of the form, and means constructed and arranged to first elevate the form and shelves together and thereafter to hold the shelves stationary during elevation of the form.

64. In a box-making machine, two co-operating reciprocatory slides one of which is guided for movement by the other, a form carried by one slide, a blank-supporting shelf carried by the other slide at each side of the form and extending beneath the blank, and means for moving the two slides independently of each other.

65. In a box-making machine, two co-operating reciprocatory slides, a form carried by one slide, yokes carried by the other slide at opposite ends of the form, and two blank-supporting shelves each mounted upon both yokes at opposite sides of the form.

66. In a box-making machine, a movable form, pairs of opposite movable walls contacting respectively with the sides and ends of a blank to fold it over the form, means for moving one pair of walls to apply pressure to the ends of the blank; and means for moving the other pair of walls into proximity with the sides of the blank during the pressure-operation.

67. In a box-making machine, a movable form, pairs of opposite movable walls contacting respectively with the sides and ends of a blank to fold it over the form, means for moving one pair of walls to apply pressure to the ends of the blank, and yieldable means for moving the other pair of walls toward the form.

68. In a box-making machine, a form, a wall cooperating with and movable toward and from the form, a rack carried by the wall, a shaft associated with the wall, a pinion upon the shaft meshing with the rack, a gear fixed to the shaft, a rack meshing with the gear, means for reciprocating the last-mentioned rack, and yieldable connections through which said last-mentioned rack is reciprocated, the connections being arranged to yield during the advance of the wall toward the form.

69. In a box-making machine, a reciprocatory form, opposite folding walls co-operating with the form, and opposite edge-gages carried by one of the walls and between which box-material is fed into folding position.

70. In a box-making machine, a reciprocatory form, opposite folding walls co-operating with the form, an upper surface of one of the walls furnishing a support over which the box is discharged, and edge-gages carried by said wall.

71. In a machine for making boxes from blanks having wings and extensions therefrom, movable means for supporting a blank, a movable member co-operating with the support, means for moving the support to carry the blank against the member and fold a wing, and means for moving the member against the blank to fold the extension.

72. In a machine for making boxes from blanks having wings and extensions therefrom, movable means for supporting a blank, a movable member co-operating with the support, means for moving the support to carry the outside of the blank against the member and fold a wing, and means for moving the member to the inside of the folded wing to fold its extension.

73. In a box-making machine, a form over which a blank may be folded, a movable folding member co-operating with the form, and means for moving the member between the blank and form while the blanks surround said form and thereafter outwardly toward the blank.

74. In a machine for making boxes from blanks having wings and extensions therefrom, a movable form over which a blank may be folded, a movable folding member co-operating with the form, means for moving the form to carry the blank against the member and fold a wing, and means for moving the member between the thus-folded blank and the form to fold the extension.

75. In a box-making machine, an expansible form over which a blank may be folded, a movable folding member co-operating with the form, and means for moving the member between the blank and contracted form.

76. In a machine for making boxes from blanks having wings and extensions therefrom, a movable expansible form over which a blank may be folded, means for moving the form to carry the blank against the member and fold a wing, means for contracting the form, and means for moving the member between the thus-folded blank and the form to fold the extension.

77. In a box-making machine, a support for a blank having wings, means for folding a wing of a supported blank including a movable folding member co-operating with the support, means for moving the folding member from outside the folded wing within and then toward said wing, a movable pressure member, and means for moving the pressure member toward the folding member.

78. In a box-making machine, a form over which a blank having wings may be folded, means for folding a wing of the blank over the form including a movable folding member co-operating with the form, and means for moving the folding member from outside the folded wing to a point within said wing and then outwardly toward the inside of the wing.

79. In a box-making machine, a form over which a blank having wings may be folded, means for folding a wing of the blank over the form including a movable folding member co-operating with the form, means for moving the folding member from outside the folded wing to a point between said wing and the form and then outwardly toward the inside of the wing, a movable pressure member, and means for moving the pressure member toward the folding member and form.

80. In a machine for making boxes from blanks having wings and extensions therefrom, an expansible form, a member co-operating with the form to fold a wing-extension toward the interior of the box and then outwardly toward the wing, and means for holding the form expanded during inward movement of the member and for contracting it.

81. In a machine for making boxes from blanks having wings and extensions therefrom, a movable expansible form, a member co-operating with the form, means for moving the form to produce folding engagement between a wing and the member, means for moving the member to fold the wing-extension toward the interior of the box and then outwardly toward the wing, and means for holding the form expanded during the inward movement of the member and for contracting it.

82. In a machine for making boxes from blanks having wings and extensions therefrom, an expansible form, a member co-operating with the form to fold a wing-extension toward the interior of the box and then outwardly toward the wing, means for holding the form expanded during the inward movement of the member and for contracting it, and a pressure member movable toward the folding member during the contraction of the form.

83. In a box-making machine, a form over which a blank may be folded, a movable folding member co-operating with the form, means for moving the member between the blank and form, and means situated between the form and blank for resisting displacement of the blank during such movement.

84. In a box-making machine, a form provided with an expansible portion and over which a blank may be folded, there being projections from the form extending outside the expansible portion toward the portion of the blank which is being folded, a movable folding member co-operating with the form, the blank-portions folded by the member contacting with the projections, and means for moving the member between the blank and form.

85. In a box-making machine, a form over which a blank may be folded, there being projections from the form toward the portion of the blank which is being folded, a movable folding member co-operating with the form and having a depression to receive the form-projection, and means for moving the member between the blank and form.

86. In a box-making machine, a form having relatively movable portions and over which a blank may be folded, a movable folding member co-operating with the form, means carried by one portion of the form and extending past another portion for supporting engagement with the blank, and means for moving the member between the blank and form.

87. In a machine for making boxes from blanks having wings and extensions therefrom, an expansible form, a member co-operating with the form to fold an extension toward the interior of the box and then outwardly toward the wing, and means for holding the form expanded during the inward movement of the member and for contracting it thereafter, there being means extending into the space between the wing and contracted form to prevent the inward collapse of said wing under the influence of the folding member.

88. In a machine for making boxes from blanks having wings and extensions therefrom, an expansible form provided with an outward projection, a member having a depression to receive the form-projection co-operating with the form to fold an extension toward the interior of the box and then outwardly toward the wing, and means for holding the form expanded during the inward movement of the member and for contracting it thereafter.

89. In a box-making machine, a form over which a blank may be folded to produce a box, a horizontally extending folding lever having a hooked contact-end provided with a blank-engaging surface extending transversely of the lever within the point of the hook, a vertically extending carrier-lever for the folding lever, and means constructed and arranged to impart to the levers movement carrying the contact-surface into and out of a box upon the form and toward and from the interior of a wall of said box.

90. In a box-making machine, a form over which a blank may be folded to produce a box, a folding lever having a hooked end movable into and out of a box on the form, a pressure-head co-operating with the lever outside the box, and means for moving the pressure-head into engagement with the box-end in a direction substantially at right-angles thereto and to the contact-end of the lever.

91. In a box-making machine, a form over which a blank may be folded to produce a box, a lever having a hooked end movable into and out of a box on the form, a pressure-head movable outside the box, and means for moving the lever-end and head toward and from each other after the entrance of said lever-end into the box.

92. In a box-making machine, a support over which a blank may be folded to produce a box, said support having a body-portion and an end-portion movable toward and from the body-portion, and a member having a hooked end movable between the support and a box thereon.

93. In a box-making machine, a support over which a blank may be folded to box-form, said support having a body-portion and an end-portion movable toward and from the body-portion, and a member having a hooked box-engaging end movable between the portions of the support.

94. In a box-making machine, a support over which a blank may be folded to box-form, said support having a body-portion and an end-portion movable toward and from the body-portion, a member having a hooked end movable between the support and a box thereon, and a pressure-head co-operating with the hooked end of the lever outside the box.

95. In a machine for making boxes having end-wings, opposite corner-laps spaced from each other within the end-wings and end-wing-extensions turned over the corner-laps, inner and outer members for applying pressure to each end-formation, one of said members being provided with a pressure-equalizing projection acting over the space between the corner-laps.

96. In a machine for making boxes having end-wings, opposite corner-laps spaced from each other within the end-wings and end-wing-extensions turned over the corner-laps, means for applying adhesive to surfaces which are to contact in each end-formation, an inner hooked pressure member provided with a projection arranged to register with the space between the corner-laps, and an outer pressure member co-operating with the inner pressure member.

97. In a box-making machine, a support over which a blank may be folded, said support having a body-portion and an end-portion movable toward and from the body-portion, said body-portion being provided with a projection for contact with the blank when the end-portion is contracted, and a folding member co-operating with the form.

98. In a box-making machine, a support over which a blank may be folded, said support having a body-portion and a slotted end-portion movable toward and from the body-portion, said body-portion being provided with a projection operating in the slot for contact with the blank when the end-portion is contracted, and a folding member co-operating with the form.

99. In a box-making machine, a support over which a blank may be folded, said support having a body-portion and an end-portion movable toward and from the body-portion, said body-portion being provided with a projection for contact with the blank when the end-portion is contracted, and a folding member co-operating with the form and having a slot to receive the projection.

100. In a box-making machine, a support over which a blank may be folded, said support having a body-portion and a slotted end-portion movable toward and from the body-portion, said body-portion being provided with a projection operating in the slot for contact with the blank when the end-portion is contracted, and a folding member co-operating with the form and having a slot to receive the projection.

101. In a box-making machine, a frame, a member carried thereby to receive pressure within a box, a slide movable upon the frame, an outer pressure member carried by the slide, a lever fulcrumed upon the frame, and connections including a spring between the lever and slide.

102. In a box-making machine, a frame, a member carried thereby to receive pressure within a box, a slide movable upon the frame, an outer pressure member carried by the slide, a lever fulcrumed upon the frame, connections including a spring between the lever and slide, and means arranged to vary the force transmitted by the spring.

103. In a box-making machine, a frame, a member carried thereby to receive pressure within a box, a slide movable upon the frame, an outer pressure member carried by the slide, a lever fulcrumed upon the frame, a rod connected to the slide, a sleeve adjustable upon the rod, an abutment member joined to the lever and surrounding the rod, and a spring interposed between the abutment member and sleeve.

104. In a box-making machine, a frame, a member carried thereby to receive pressure within a box, a carrier-slide movable upon the frame, an outer pressure member arranged to slide upon the carrier-slide, and an adjusting-screw threaded into one of the sliding members and engaging the other.

105. In a box-making machine, a frame, a member arranged to receive pressure within a box, a divided carrier-lever for the member, an outer pressure member movable upon the frame, and actuating connections for the outer pressure member extending between the divided portions of the carrier-lever.

106. In a box-making machine, pressure members arranged for engagement with the interior and exterior of a box, the box-contacting surfaces of said members diverging from each other when in pressure-applying position.

107. In a machine for making boxes having an end-wing and an end-wing-extension turned in upon said end-wing and separated therefrom by a crease, an external pressure member arranged for engagement with the end-wing, and an internal pressure member arranged for engagement with the end-wing-extension, the work-contacting surfaces of the members being spaced most widely from each other adjacent to the crease.

108. In a box-making machine, a form over which a blank may be folded, an abutment member spaced from the form to admit blanks between them and being in close proximity to said form, means for feeding the blanks between the form and abutment member, and a stop to position the blanks when thus fed, contact of the blanks with the form and member preventing their distortion and displacement upon engagement with the stop.

109. In a box-making machine, a form over which a blank may be folded, an abutment member spaced from the form to admit blanks between them and being in close proximity to said form, means for moving the form and abutment member relatively to clamp a blank between them for folding and for thereafter separating said form and abutment member, and means for applying pressure to the folded blank during such separation.

110. In a box-making machine, a form over which a blank may be folded, an abutment member spaced from the form to admit blanks between them and being in close proximity to said form, means for feeding the blanks between the form and abutment member, a stop to position the blanks when thus fed, means for moving the form and abutment relatively to clamp a delivered blank between them and to advance it for folding, folding members acting upon the blank during this movement, and a folding member movable into the interior of the thus-folded blank while it is clamped.

111. In a box-making machine, a form over which a blank may be folded, an abutment member spaced from the form to admit blanks between them and being in close proximity to said form, means for feeding the blanks between the form and abutment member, a stop to position the blanks when thus fed, means for moving the form and abutment member relatively to clamp a delivered blank between them and to advance it for folding and thereafter separating the form and abutment member, folding members acting upon the blank during this movement, and pressure means co-operating with the form during the period of separation.

112. In a box-making machine, a support for engagement with the interior and exterior of a box formed from a creased and folded blank of laminated material, and means co-operating with the support in engagement with the interior and exterior of the box for separating the laminæ of the blank at the crease.

113. In a box-making machine, a form over which a creased blank of laminated material may be folded, and means co-operating with the form for separating the laminæ of the blank at the crease, the form having a space into which the separated laminæ may protrude.

114. In a box-making machine, a support for a box formed from a creased and folded blank, means for moving a portion of the box at one side of the crease, and means for holding the portion at the opposite side of the crease against movement into the interior of the box.

115. In a box-making machine, members movable to fold to box-form a creased blank, and means for moving the folding members at the completion of the folding operation to separate the laminæ of the blank at a crease.

116. In a box-making machine, means for clamping against movement opposite walls of a box folded from a creased blank, and means for engaging the opposite sides of the wall intermediate the clamped walls and moving it between said clamped walls.

117. In a box-making machine, means for clamping the four side-walls of a box formed from a creased and folded blank, and means for forcing the body-portion or intermediate wall between the side-walls.

118. In a box-making machine, members movable to fold a creased blank to form four side-walls extending from a body-portion, means for holding the folding members against movement to clamp the walls, and means for moving the body-portion and side-walls relatively to upset the creases between them.

119. In a box-making machine, a form, members movable to fold a creased blank about the form and then to clamp the folded side-walls to the form, an abutment member contacting with the body-portion of the blank between the side-walls, and means for moving the form and abutment member to carry the body-portion between the side-walls.

120. In a box-making machine, opposite clamping members for the body-portion of a box-blank having wings, said clamping members leaving the blank-wings free, means for moving the clamping members together in opposite directions, and folding walls against which the wings are carried by the clamping members upon movement in one direction, said folding walls being provided with means against which the wing-edges are forced during the movement of the clamping members in the opposite direction.

121. In a box-making machine, opposite clamping members for the body-portion of a box-blank having wings, said clamping members leaving the blank-wings free, means for moving the clamping members together in opposite directions, folding walls against which the wings are carried by the clamping members upon movement in one direction, and pressure members co-operating with the clamping members and acting upon the blank-wings, said pressure members being in their blank-engaging relation during movement in the opposite direction.

122. In a box-making machine, opposite clamping members for the body-portion of a box-blank having wings, said clamping members leaving the blank-wings free, means for moving the clamping members together in opposite directions, folding walls against which the wings are carried by the clamping members upon movement in one direction, said walls being provided with means against which the wing-edges are forced during the movement of the clamping members in the opposite direction, and pressure members co-operating with the clamping members and acting upon the blank-wings, said pressure members being in their blank-engaging relation during movement in said opposite direction.

123. In a box-making machine, a movable support over which a blank may be folded into box-form, a pressure-plate co-operating with the support, folding walls co-operating with the support and plate, and means for moving the support and plate relatively at different speeds to clamp the body of the blank between them and for moving the support and plate together in one direction to fold the blank against the walls and then oppositely with the formed box between them.

124. In a box-making machine, a movable support over which a blank may be folded into box-form, a pressure-plate co-operating with the support, folding walls co-operating with the support and plate, means for moving the support and plate relatively to clamp the body of the blank between them and for moving the support and plate together in one direction to fold the blank against the walls and then oppositely with the formed box between them, and means for holding a portion of said formed box during such opposite travel of the support and plate against movement in the direction of said travel.

125. In a box-making machine, a movable support over which a blank may be folded into box-form, a pressure-plate co-operating with the support, folding walls co-operating with the support and plate, and means for moving the support and plate relatively to clamp the body of the blank between them and for moving the support and plate together in one direction to fold the blank against the walls and then oppositely with the formed box between them, the folding walls having shoulders for engagement with the edges of the box-walls during such opposite travel of the support and plate.

126. In a box-making machine, a movable support over which a blank may be folded into box-form, a pressure-plate co-operating with the support, folding walls co-operating with the support and plate, means for moving the support and plate relatively to clamp the body of the blank between them and for moving the support and plate together in one direction to fold the blank against the walls and then oppositely with the formed box between them, inner and outer box-pressure members co-operating with the support and plate, and means for holding said members in their pressure-applying relation during such opposite travel of the support and plate.

127. In a box-making machine, a movable support over which a blank may be folded into box-form, a pressure-plate co-operating with the support, folding walls co-operating with the support and plate, means for moving the support and plate relatively to clamp the body of the blank between them and for moving the support and plate together in one direction to fold the blank against the walls and then oppositely with the formed box between them, the folding walls having shoulders for engagement with the edges of the box-walls during such opposite travel of the support and plate, inner and outer box-pressure members co-operating with the support and plate, and means for holding said members in their pressure-applying relation during such opposite travel of the support and plate.

128. The method of making boxes from creased blanks, which consists in setting up a blank into box-form, and exerting upon the set-up box an area adjacent to a crease a pressure upsetting said crease while holding against movement in the direction of pressure the portion of the blank at the opposite side of the crease.

129. The method of making boxes from creased blanks of laminated material, which consists in setting up a blank in box-form, and exerting pressure upon the walls of the set-up box at opposite sides of a crease while maintaining such walls against flexure to separate the laminæ at said crease.

130. The method of making boxes from blanks, which consists in setting up a blank into a box having a body-portion and peripheral walls, exerting pressure upon the body-portion of the box, and holding the peripheral walls against movement in the direction of pressure during its application.

131. The method of making boxes from blanks, which consists in setting up a blank into a box having a body-portion and peripheral walls, exerting pressure upon the body-portion of the box in a direction tending to force it between the peripheral walls, and holding said walls against movement in the direction of pressure during its application.

132. In a box-making machine, means for folding a blank to box-form, a member movable to exert pressure upon the folded box, and automatic means acting during such application of pressure for releasing the member and discontinuing the pressure.

133. In a box-making machine, means for folding a blank to box-form, a member movable to exert pressure upon the folded box, and means movable by the pressure member for releasing said member and discontinuing the pressure.

134. In a box-making machine, means for setting up a blank into box-form, a yieldable member for exerting pressure upon the blank, means for controlling the normal yield of the member, and means for releasing the controlling means.

135. In a box-making machine, means for setting up a blank into box-form, a yieldable member for exerting pressure upon the blank, means for controlling the normal yield of the member, and means governed by the resistance offered to the pressure member for releasing the controlling means.

136. In a box-making machine, setting-up mechanism including a support, a movable pressure member co-operating therewith, connections for moving the member, and means forming a part of the connections through which movement is transmitted and governed by the resistance offered to the pressure member for breaking said connections.

137. In a box-making machine, setting-up mechanism including a support, a movable pressure member co-operating therewith, yieldable connections for moving the member, and means governed by the amount of yield of the connections for releasing the pressure member.

138. In a box-making machine, setting-up mechanism including a support, a movable pressure member co-operating therewith, yieldable connections for moving the member, and means governed by the amount of yield of the connections for breaking said connections.

139. In a box-making machine, a form, a movable pressure-plate co-operating therewith, means for moving the plate, connections between the moving means and plate and including a lever, a latch for holding the lever in movement-transmitting relation, and means for releasing the lever from the latch.

140. In a box-making machine, a form, a movable pressure-plate co-operating therewith, means for moving the plate, connections between the moving means and plate and including a lever, a latch for holding the lever in movement-transmitting relation, and a spring against which the lever is yieldable to release the latch.

141. In a box-making machine, a form, a movable pressure-plate co-operating therewith and having a rod, a movable girt upon which the rod is movably mounted, means for moving the girt, and means carried by the girt for controlling the movement of the rod thereon.

142. In a box-making machine, a form, a movable pressure-plate co-operating therewith and having a rod, a movable girt upon which the rod is movably mounted, means for moving the girt, means carried by the girt for controlling the movement of the rod thereon, and yieldable connections between the girt and rod.

143. In a box-making machine, a form, a movable pressure-plate co-operating therewith and having a rod, a movable girt upon which the rod is movably mounted, means for moving the girt, and connections between the girt and rod having portions arranged to separate and release the rod from the moving means.

144. In a box-making machine, a form over which blanks may be folded to box-form, a movable pressure member co-operating with the form, means for moving the member toward the form to exert forming pressure upon the blank, operating means for the pressure member, and means controlled by the pressure member for stopping the operating means.

145. In a box-making machine, means for folding a blank to box-form, a member movable to exert pressure upon the folded box, automatic means for releasing the pressure member and discontinuing the pressure, and means made effective by the release of the member for stopping the machine.

146. In a box-making machine, means for setting up a blank into box-form, a yieldable member exerting forming pressure upon the set-up box, and means made effective upon the yield of the member beyond a predetermined amount for stopping the machine.

147. In a box-making machine, means for setting up a blank into box-form, a yieldable member for exerting pressure upon the set-up box, means for controlling the normal yield of the member, means for releasing the controlling means, and connections to the controlling means for stopping the machine upon such release.

148. In a box-making machine, setting-up mechanism including a support, a movable pressure member co-operating therewith, connections for moving the member, means governed by the resistance offered to the pressure member for breaking the connections, and means acted upon by the connections when broken for stopping the machine.

149. In a box-making machine, setting-up mechanism including a support, a movable carrier, a pressure member movable upon the carrier and co-operating with the support, operating means for the carrier, a stop device for controlling the operating means, and a member movable under the control of the pressure member upon the carrier into and out of co-operation with the stop device.

150. In a box-making machine, setting-up mechanism including a support, a movable carrier, a pressure member movable upon the carrier and co-operating with the support, operating means for the carrier, a stop device for controlling the operating means, a member movable upon the carrier into and out of co-operation with the stop device, a latch for the last-mentioned member, and means movable with the pressure member for releasing the latch.

151. In a box-making machine, a form, a movable pressure-plate co-operating therewith and having a rod, a movable girt upon which the rod is movably mounted, an electric motor for driving the machine, a switch for controlling the motor, a contact member movable upon the girt for engagement with the switch, a latch for the member, and means carried by the rod for releasing the latch.

152. In a box-making machine, a form, a movable pressure-plate co-operating therewith and having a rod, a movable girt upon which the rod is movably mounted, means carried by the girt for controlling the movement of the rod thereon, a motor for the machine, a stop device for the motor, and a member movable upon the girt to control the stop device.

153. In a box-making machine, a form, a movable pressure-plate co-operating therewith and having a rod, a movable girt upon which the rod is movably mounted, means carried by the girt for controlling the movement of the rod thereon, a motor for the machine, a stop device for the motor, a member movable upon the girt to control the stop device, and a latch for the member mounted upon the girt and movable under the influence of the rod.

154. In a box-making machine, a movable form over which a blank may be folded, movable folding members associated with the form and having box-supporting projections formed upon them, and means for moving the folding means to position the supporting projections for engagement by the box.

155. In a box-making machine, blank-folding mechanism including a movable form, a movable pressure member co-operating with the form, there being means movable with the member for supporting a box folded over said form, and means for moving the form to position the box to receive the pressure of the member and for thereafter moving the form to leave the box supported upon the member, 156. In a box-making machine, blank-folding mechanism including a movable form, a movable pressure member co-operating with the form and having means for supporting a box folded over said form, means for moving the form to position the box to receive the pressure of the member and for thereafter moving the form to leave the box supported upon the member, and means for moving the member toward the form to exert its pressure, for withdrawing the member to permit movement of the form and for again moving the member inwardly to support the box.

157. In a box-making machine, blank-folding means, a movable pressure member co-operating with the folding means, and a box-ejecting member movable upon the pressure member.

158. In a box-making machine, blank-folding means, a movable pressure member co-operating with the folding means and provided with a box-supporting surface, and an ejecting member movable upon the pressure member into contact with a box supported upon said surface.

159. In a box-making machine, a vertically reciprocatory form, blank-folding members co-operating with the form during its movement, opposite pressure members co-operating with the form and provided with box-supporting shoulders, and a member movable toward the shoulders in engagement with the box.

160. In a box-making machine, a vertically reciprocatory form, blank-folding members co-operating with the form during its movement, opposite pressure members co-operating with the form and provided with box-supporting shoulders, and reciprocatory box-ejecting members movable upon the pressure members.

161. In a box-making machine, setting-up mechanism having folding walls, one of said walls having a box-supporting surface, means for ejecting boxes from the setting-up mechanism over said surface, and pressure members associated with the folding walls and having means for supporting the box in preparation for its ejection.

162. In a box-making machine, setting-up mechanism having folding walls, one of said walls having a box-supporting surface, means for ejecting boxes from the setting-up mechanism over said surface, and pressure members associated with the folding walls and upon which the ejecting means is mounted, said pressure members having means for supporting the box in preparation for its ejection.

163. In a box-making machine, setting-up mechanism, means for ejecting a box from the setting-up mechanism, a chute to which the ejecting means delivers, a trough receiving boxes from the chute and having one longitudinal wall higher than the other, and a conveyor movable upon the lower wall and having box-engaging fingers extending transversely of the trough toward the higher wall.

164. In a box-making machine, mechanism constructed and arranged to set up a blank into box-form, a conveyor for removing the set-up boxes, driving means for the conveyor, connections between the driving means and conveyor constructed and arranged to separate and stop the conveyor when abnormal resistance is encountered, primary driving means for the machine, and a stop device for the driving means controlled by the connections.

165. In a box-making machine, mechanism constructed and arranged to set up a blank into box-form, a conveyor for removing the set-up blank, a wheel over which the conveyor operates, and a driving shaft for the wheel, said wheel and shaft being provided with a co-operating depression and projection relatively yieldable and through which the driving force is transmitted, the projection being furnished by a lever having a rotatable roll entering the depression.

166. In a box-making machine, mechanism constructed and arranged to set up a blank into box-form, a conveyor for removing the set-up blank, a wheel over which the conveyor operates, a driving shaft for the wheel, said wheel and shaft being provided with a cooperating depression and projection relatively yieldable and through which the driving force is transmitted, a motor for driving the machine, and a stop device for the motor operable under the influence of the yieldable element.

167. In a box-making machine, mechanism constructed and arranged to set up a blank into box-form, a conveyor for removing the set-up blank, a wheel over which the conveyor operates, said wheel being provided with a depression, a driving shaft for the wheel, a member yieldable upon the shaft and arranged to enter the depression, a motor for driving the machine, and a stop device for the motor operable by the yieldable member.

CUTLER D. KNOWLTON.